(12) United States Patent
Ruf

(10) Patent No.: US 9,518,824 B2
(45) Date of Patent: Dec. 13, 2016

(54) CONTROL DEVICE, ROTATION RATE SENSOR AND METHOD OF OPERATING A CONTROL DEVICE WITH HARMONIC SET POINT SIGNAL

(71) Applicant: Northrop Grumman LITEF GmbH, Freiburg (DE)

(72) Inventor: Markus Ruf, Waldkirch (DE)

(73) Assignee: Northrop Grumman LITEF GmbH (DE)

( * ) Notice: Subject to any disclaimer, the term of this patent is extended or adjusted under 35 U.S.C. 154(b) by 253 days.

(21) Appl. No.: 14/361,860

(22) PCT Filed: Oct. 15, 2012

(86) PCT No.: PCT/EP2012/004307
§ 371 (c)(1),
(2) Date: May 30, 2014

(87) PCT Pub. No.: WO2013/079139
PCT Pub. Date: Jun. 6, 2013

(65) Prior Publication Data
US 2015/0211857 A1  Jul. 30, 2015

(30) Foreign Application Priority Data

Dec. 1, 2011 (DE) .......... 10 2011 119 949

(51) Int. Cl.
*H03B 5/30* (2006.01)
*G01C 19/5776* (2012.01)
(Continued)

(52) U.S. Cl.
CPC .......... *G01C 19/5776* (2013.01); *G01C 19/00* (2013.01); *G01C 19/56* (2013.01); *G01C 19/5747* (2013.01)

(58) Field of Classification Search
CPC ..... G01C 19/00; G01C 19/5747; G01C 19/56; H03B 5/30
(Continued)

(56) References Cited

U.S. PATENT DOCUMENTS

| 2006/0087370 A1 | 4/2006 | Tsuruhara et al. |
| 2014/0260609 A1* | 9/2014 | Garbarino .......... G01C 19/5726 73/504.12 |

FOREIGN PATENT DOCUMENTS

| CN | 1320207 A | 10/2001 |
| CN | 1651666 A | 8/2005 |

(Continued)

OTHER PUBLICATIONS

Chinese Office Action for Application No. 201280059527.0 dated Nov. 18, 2015.

*Primary Examiner* — Arnold Kinkead
(74) *Attorney, Agent, or Firm* — Tarolli, Sundheim, Covell & Tummino LLP

(57) ABSTRACT

A control device comprises a sensor unit, which outputs a measurement signal, which reflects a deviation of an oscillator along a direction of excitation. A controller main unit derives a control signal for an actuator unit from the measurement signal and a harmonic set point signal such that the actuator unit counteracts a deviation of the deflection of the oscillator from a set amplitude of a harmonic resonance oscillation. A controller extension unit estimates actual-phase and actual-amplitude of a residual oscillation of the oscillator and synchronizes the harmonic set point signal with the residual oscillation at a deactivated actuator unit. The residual energy contained in the residual oscillation is used, in order to arrive faster at a defined operation state of the oscillator.

16 Claims, 10 Drawing Sheets

(51) Int. Cl.
*G01C 19/00* (2013.01)
*G01C 19/5747* (2012.01)
*G01C 19/56* (2012.01)

(58) Field of Classification Search
USPC .......... 331/116 M, 154, 175, 182; 73/504.12
See application file for complete search history.

(56) References Cited

FOREIGN PATENT DOCUMENTS

| | | |
|---|---|---|
| CN | 1965334 A | 5/2007 |
| CN | 101099155 A | 1/2008 |
| CN | 102153043 A | 8/2011 |
| DE | 102 40 087 A1 | 3/2004 |
| DE | 10 2005 043 592 | 3/2007 |
| DE | 10 2008 044 00 | 5/2010 |
| DE | 10 2010 055 631 | 6/2012 |
| EP | 2 336 717 A1 | 6/2011 |
| EP | 1905155 B1 | 5/2012 |
| WO | WO-93/15447 A1 | 8/1993 |

* cited by examiner $$\frac{K_I}{K_P} = s_0 \quad vz = sign(K_I)$$

$$(T_S + T_R) \cdot \omega_0 = \frac{3}{2}\pi \quad \text{für} \quad vz = +1$$

$$(T_S + T_R) \cdot \omega_0 = \frac{1}{2}\pi \quad \text{für} \quad vz = -1$$

$$\frac{K_I}{K_P} \approx s_0 \quad vz = sign(K_I)$$

$$\left(\beta_S + \beta_D + \frac{1}{2}\right) \cdot \omega_0 \cdot T = \frac{3}{2}\pi \quad für \quad vz = +1$$

$$\left(\beta_S + \beta_D + \frac{1}{2}\right) \cdot \omega_0 \cdot T = \frac{1}{2}\pi \quad für \quad vz = -1$$

CONTROL DEVICE, ROTATION RATE SENSOR AND METHOD OF OPERATING A CONTROL DEVICE WITH HARMONIC SET POINT SIGNAL

BACKGROUND

Field of the Invention

The invention refers to a control unit with harmonic command variables or set point signals and to a method for operating a control device with harmonic command variables.

Description of the Prior Art

Conventional control methods are tailored to control problems with constant or only slowly changing command variables in which the value of a controlled process variable affected by a disturbance is kept close to a predetermined set point, or is updated as close as possible to a varying set point. Some applications (e.g. micromechanical rotation rate sensors for analysis of a Coriolis force) provide excitation of an oscillator with its resonance frequency and with an oscillation amplitude defined by a control loop. In this process, a controller controls the force signal generated by it so that the difference between a predetermined harmonic set point signal and a measured oscillator movement vanishes.

In this process, a measurement signal which reflects the movement of an oscillator along a direction of excitation typically is at first fed to a demodulator. The demodulator multiplies the measurement signal with a harmonic signal of angular frequency $\omega_d$ that corresponds to the resonance angular frequency $\omega_0$ of the oscillator. Control is itself performed with a set point signal in the baseband being constant or, in any case, independent of the resonance angular frequency. The output signal of the controller is then re-modulated in a modulator on a harmonic signal with an angular frequency $\omega_m$, which corresponds to the resonance frequency $\omega_0$ of the oscillator. The modulation product is then compared with the predetermined set signal. The difference between the two signals finally controls an actuator, which imposes a force to the oscillator based on the controller signal so that the oscillator oscillates according to the predetermined set oscillation. As control is performed within baseband, a low pass filter filters the frequency conversion products, in particular at the double resonance frequency. The bandwidth of the controller and, hence, its reaction speed to changes of the deflection is limited by such process.

A control with a harmonic set point signal in the frequency band of the resonance angular frequency $\omega_0$ of the oscillator is described in not yet published German patent application DE 102010055631.9.

In many applications the oscillator oscillates with a decaying amplitude after deactivation of the drive. In the control activated during a decay phase of the oscillator, the activation time depends on the phase and amplitude difference between the decaying oscillation and the set point signal.

SUMMARY AND OBJECTS OF THE INVENTION

It is an object of the invention to provide a control concept for improving the switch-on behavior of a control device for a harmonic command variable.

In a first aspect, the invention provides a control device. Such device includes a sensor unit suitable for outputting a measurement signal representing a deflection of an oscillator along a direction of excitation.

An actuator unit is provided that acts on the oscillator which is controllable by control signals. Such activator includes a controller main unit configured to deduce from the measurement signal and a harmonic set point signal a control signal for the actuator unit so that the actuator unit counteracts a deviation of the deflection of the oscillator from a set amplitude of a harmonic resonance oscillation of the oscillator.

A controller extension unit is configured to determine an actual-phase and an actual-amplitude of a residual oscillation of the oscillator from the measurement signal at a deactivated actuator unit and to output to the controller main unit a harmonic set point signal adapted to the actual-phase and the actual-amplitude so that, after activating the actuator unit, an amplitude of the residual oscillation of the oscillator is phase-synchronously amplified up to the set amplitude and, in this process, energy stored in the residual oscillation is dissipated.

In a second aspect, a rotation rate sensor is provided. The sensor includes a moveably supported oscillator which is excitable in a direction of excitation to a harmonic resonance oscillation.

A sensor unit is suitable for outputting a measurement signal representing a deviation of the oscillator along the direction of excitation.

An actuator unit, acting on the oscillator, is controllable by control signals. The actuator unit includes a controller main unit configured to deduce a control signal for the actuator unit from the measurement signal and a harmonic set point signal so that the actuator unit counteracts a deviation of deflection of the oscillator from a set amplitude of a resonance oscillation. A controller extension unit is configured to determine an actual-phase and an actual-amplitude of a residual oscillation of the oscillator from the measurement signal at the deactivated actuator unit and to output to the controller main unit a harmonic set point signal adapted to the actual-phase and the actual-amplitude so that, after activating the actuator unit, an amplitude of the residual oscillation of the oscillator is amplified phase-synchronously up to a set amplitude and, in this process, energy stored in the residual oscillation is dissipated.

In a third aspect, the invention provides a method for operating a control device with harmonic command variables. Such method includes the step of generating a measurement signal representing a deflection of an oscillator along a direction of excitation by means of a sensor unit. A phase and amplitude synchronous harmonic set point signal is generated based on an estimation of an actual-phase and an actual-amplitude of a residual oscillation of the oscillator at a deactivated actuator unit. A synchronized control signal is generated for an actuator unit from the measurement signal and the phase and amplitude synchronous harmonic set point signal such that the actuator unit counteracts deviations of the oscillator from a harmonic oscillation, and the actuator unit is activated at or after providing the synchronized control signal.

The foregoing and other features of the invention will become further apparent from the detailed description that follows. Such description is accompanied by a set of drawing figures. Numerals of the drawing figures, corresponding to those of the written description, point to the features of the invention with like numerals referring to like features throughout.

DETAILED DESCRIPTION OF THE PREFERRED EMBODIMENT

Figure 1:
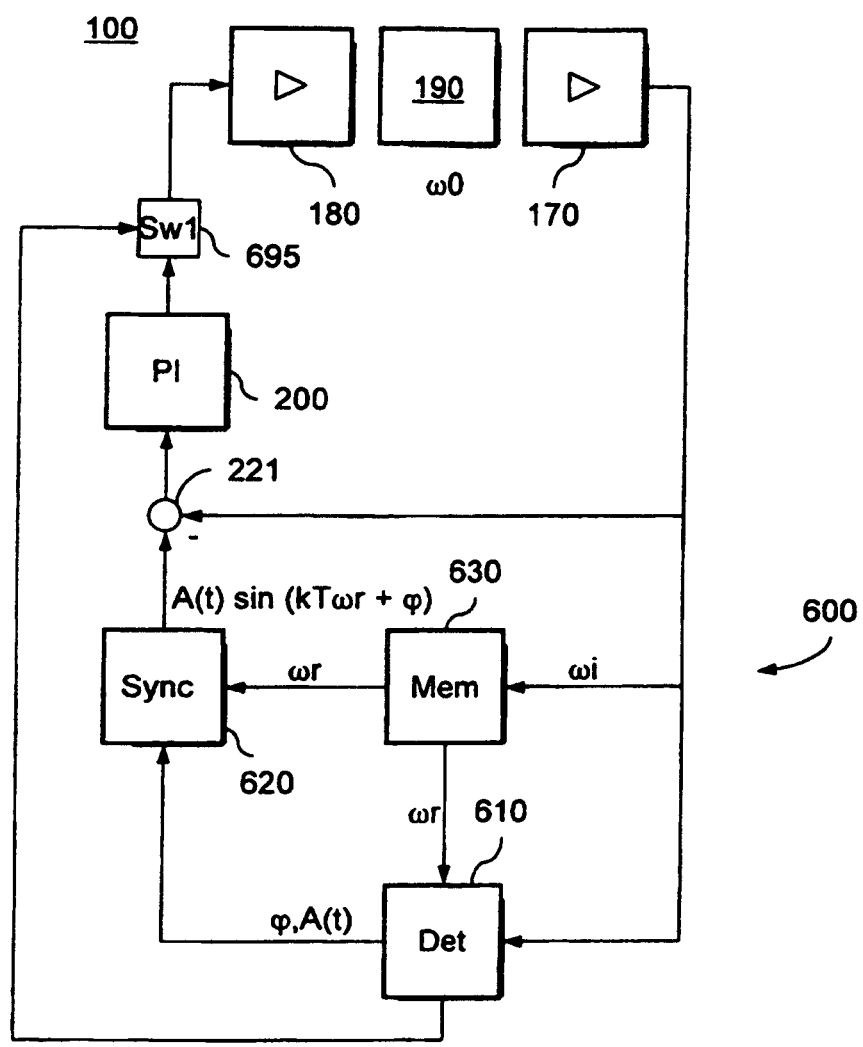
FIG. 1 is a schematic block diagram of a device with a control device according to an embodiment of the invention, which comprises a controller main unit for controlling a harmonic oscillation based on a harmonic set point signal and a controller extension unit for synchronizing the harmonic set point signal.

The device 100 shown in FIG. 1 comprises an oscillator 190 and a control device with a controller main unit 200 and a controller extension unit 600. The oscillator 190 is a mass, which is moveably suspended along a direction of excitation and is capable to oscillate along the direction of excitation with a resonance frequency $\omega_0$. In the stationary case the oscillator 190 performs a translational or rotational oscillation with the resonance angular frequency $\omega_0$. According to an embodiment the oscillator 190 is an excitation unit, a Coriolis unit or a detection unit of a rotation rate sensor. The rotation rate sensor may be for example formed as an MEMS (microelectromechanical system).

The sensor 170 captures the movements of the oscillator 190 and outputs a measurement signal that reflects the whole deflection of the oscillator 190 along a direction of excitation. The measurement signal corresponds to a controller input signal for the controller main unit 200. The controller main unit 200 compares the controller input signal with a harmonic set point signal output from the controller extension unit 600 and generates, based on the signal difference, a controller output signal that is output to an actuator unit 180. The controller main unit 200 determines the controller output signal such that the actuator unit 180 generates a force signal such that the difference between the predetermined harmonic set point signal and the measured movement of the oscillator 190 vanishes.

According to an embodiment, the controller extension unit 600 comprises an actuator activation unit 695 by which the actuator unit 180 can be activated. In the block diagram of FIG. 1 the actuator activation unit 695 is illustrated as a switch in the supply of the controller output signal to the actuator unit 180. The switch is controllable by the output signal of the controller extension unit 600.

The controller extension unit 600 is activated by the control device (e.g. by switching on an operation voltage). The actuator unit 180 is initially deactivated. Depending on previous history, the oscillator 190 is addressed or performs residual oscillation if the actuator unit 180 is deactivated. The controller extension unit 600 determines, while the actuator unit 180 is still deactivated, an actual-phase and an actual-amplitude of such a residual oscillation of the oscillator 190 from the measurement signal and supplies a synchronized set point signal, adapted to the actual phase and the actual amplitude, to the controller main unit. As soon as the harmonic set point signal or the deduced synchronized control signal is available, the controller extension unit 600 activates the actuator unit 180 via the actuator activation unit 695 so that the amplitude of the residual oscillation of the oscillator 190 is phase synchronously amplified to the set amplitude and, in this process, the energy contained in the residual oscillation is dissipated.

The controller extension unit 600 allows setting of the oscillator, starting from all considerable initial states, to its set amplitude in very short time and to maintain it there. A residual oscillation occurs, in particular if the oscillator 190 is to be brought to oscillate with the set amplitude after deactivating the drive or the actuator unit 180, at an arbitrary point within the decay time.

According to an embodiment, the control devices 200, 600 and the oscillator 190 are constituents of a rotation rate sensor of a navigation instrument, in particular of a navigation instrument for an aircraft that has to be transferred into an undisturbed operation state after a short time power breakdown, in as short as possible a time. The controller extension unit 600 estimates amplitude and phasing of the decaying residual oscillation of the oscillator 190.

According to an embodiment, the controller extension unit 600 comprises a Kalman filter for estimating amplitude and phasing. From the amplitude and phasing of the residual oscillation an initial phase as well as an initial amplitude for a phase and amplitude correct switch-on of the harmonic set point signal, are deduced through consideration of internal signal runtimes. The present residual oscillation is used to reduce the period of recomissioning after switch-off for a short time. The larger the amplitude of the present residual oscillation, the less time necessary to let the oscillator oscillate with the set amplitude. Hence, in particular after short breakdowns of the power supply recomissioning time (ramp up time) of a system comprising the control device 200, 600 is reduced.

According to the embodiment illustrated in FIG. 1 the controller extension unit 600 comprises a capturing unit 610 and a synchronization unit 620. The capturing unit 610 determines the actual phase and the actual amplitude of the residual oscillation of the oscillator 190 from the measurement signal at least in an activation phase of the device 100 (e.g. after switching on the operation voltage again). From the actual phase and the actual amplitude as well as further system parameters, e.g. signal runtimes and signal retardation times, the capturing unit 610 determines synchronization information indicating the phase and amplitude of the harmonic set point signal generated by the synchronization unit 620. The synchronization unit 620 receives the synchronization information and transfers the harmonic set point signal determined by the synchronization information to the controller main unit 200. For example, the controller main unit 200 comprises a summation unit 221 which forms a difference signal from the harmonic set point signal output from the synchronization unit 620 and the measurement signal.

According to an embodiment, the resonance angular frequency $\omega_r$ of the harmonic set point signal is predetermined by the resonance angular frequency $\omega_0$ of the oscillator 190. This frequency is also integrated as initial value in the estimation for the actual phase and the actual amplitude. According to another embodiment, the controller extension unit 600 comprises a temperature capturing unit, wherein the capturing unit 610 bases the estimation of the actual phase and actual amplitude on a temperature corrected resonance angular frequency of the oscillator 190, and the harmonic set point signal oscillates with the temperature corrected resonance angular frequency.

According to the embodiment illustrated in FIG. 1 the controller extension unit 600 comprises a frequency storage unit 630, which stores frequency information describing the current oscillation frequency of the oscillator 190 in temporal intervals. According to an embodiment, the frequency storage unit 630 stores the current resonance angular frequency periodically in non-volatile storage. For example, the update frequency is chosen so that application typical temperature changes may be followed. According to an embodiment, the update frequency is in a range from 1 Hz to 100 Hz (e.g. around 10 Hz).

The controller extension unit 600 retrieves the frequency information for estimating the actual phase and the actual amplitude of the residual oscillation of the oscillator 190 and/or uses the stored frequency information for generating the harmonic set point signal (e.g. for controlling an oscillator generating the set point signal). During the relevant time periods for recommissioning, within the decay time of the oscillation of the oscillator 190, the temperature and, therefore, the resonance angular frequency of the oscillator 190 barely changes so that the value for the driving frequency last stored during ongoing operation in a non-volatile storage represents, after a restart, a sufficiently good approximate value for the actual resonance angular frequency oscillator 190 and may be used as the initial value for the control. For example, oscillators in micromechanical rotation rate sensors have time constants in a range of 10 s. After deactivating the force transmission (e.g. after lose of an operation voltage) the oscillator still oscillates after about 30 s with about 5% of the set amplitude.

According to an embodiment, a sequence control of the capturing unit 610 controls the actuator activation unit 695 such that the actuator unit 180 is only activated if the controller extension unit 600 outputs a phase and amplitude synchronous harmonic set point signal. According to an embodiment, the actuator activation unit 695 is a switching device (e.g. a digital switch) which supplies the actuator unit 180 with the controller output signal of the controller main unit 200 only if a phase and amplitude correct harmonic set point signal is available to the controller main unit 200.

According to another embodiment, the capturing unit 610 deactivates at least after determining the synchronization information of such partial units of the controller extension unit 600 which are not needed anymore.

Figure 2A:
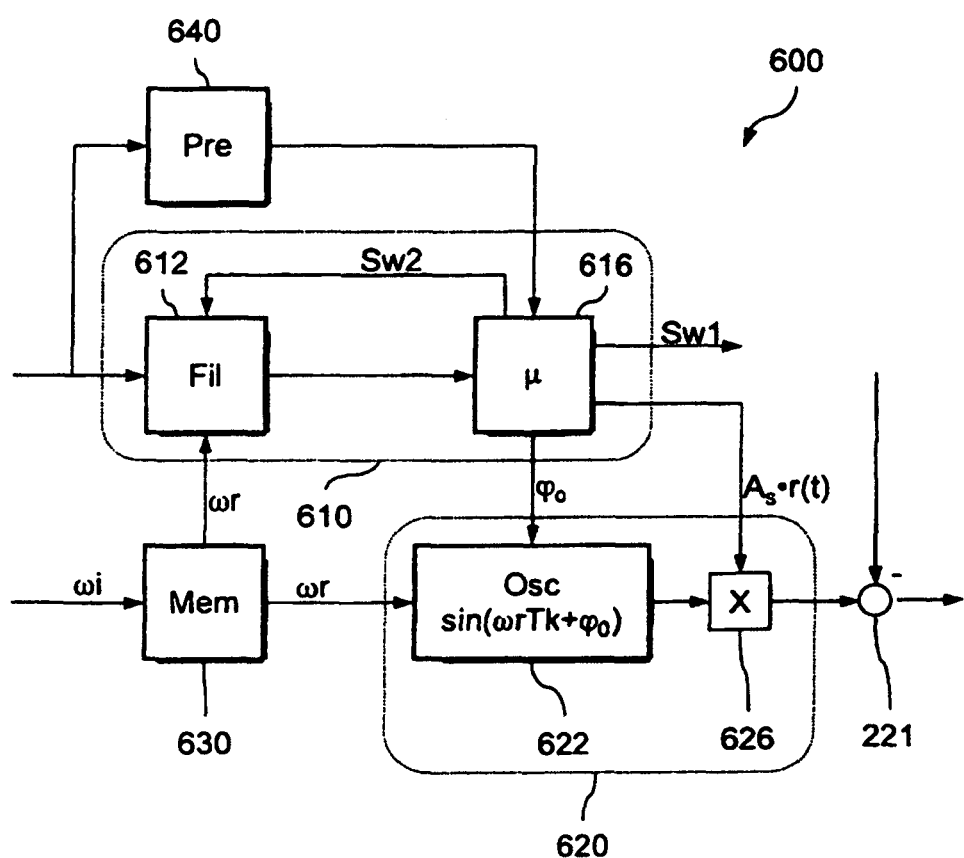
FIG. 2A is a simplified block diagram with details of the controller extension unit of FIG. 1 according to another embodiment.

FIG. 2A illustrates details of the capturing unit 610. According to an embodiment the capturing unit 610 comprises a filter unit 612. For example, an analogue measurement signal is sampled with a sampling time T and converted into a digital measurement signal in this process. The filtering unit 612 estimates, for example, the estimated zero points from the sampling values of the measurement signal, an estimation value for the variance of a measurement noise contained in the measurement signal, and an estimation value for a constant amplitude offset of the measurement signal estimation values for a variation in time of the residual oscillation. According to an embodiment, the filter unit 612 uses frequency information which is, for example, read out from the frequency storage unit 630 in this process. A control unit 616 determines values of the variation in time of the residual oscillation the synchronization information based on the actual-phase and the actual-amplitude from the estimation. In this process, the control unit 616 takes into account the retardation resulting from the filtering, the required calculations and transient oscillation retardations. The control unit 616 calculates the initial phase $\phi_0$ and the initial value $A_s$ for the amplitude of the harmonic set point signal and the time $t_0$ at which the harmonic set point signal calculated in this way is in phase with the actual oscillation of the oscillator 190.

The synchronization unit 620 comprises, for example, a controllable oscillation circuit 622, whose phase is controllable. According to an embodiment, the frequency of the oscillator is also controllable. For example, the frequency of the oscillator is temperature-controlled such that a temperature-dependent change of the harmonic resonance angular frequency of the oscillator 190 may be followed. According to another embodiment, the resonance angular frequency $\omega_r$ of the oscillator circuit 622 is determined by the last entry into the frequency storage unit 630. The information about the last stored frequency may be supplied to the oscillator circuit 622 directly from the frequency storage unit 630 or via the control unit 616.

The amplitude of the harmonic set point signal is controlled so that it is ramped up, according to a time function r(t) based on an initial amplitude value $A_s$ corresponding to the estimated actual-amplitude of the oscillation of the oscillator 190, to the set value of the amplitude of the harmonic oscillation of the oscillator 190. For example, in this process the control unit 616 outputs a ramp signal with the initial value of the estimated actual amplitude and the end value of the set point amplitude, whose variation in time and/or whose time constant is adapted to the actual phase.

A multiplicator unit 626 multiplies the amplitude signal $A_s \cdot r(t)$ with the output signal of the oscillator circuit 622. At the summation point 221, the difference is formed between the harmonic set point signal and the measurement signal. According to an embodiment, the control unit 616 deactivates the filter unit 612 once their results are transmitted to the control unit 616. The deactivation of the filter unit 612 reduces, for example, the power consumption. In addition, in a realization in a microprocessor, the computation capacity needed for estimation may be freed for the computation operations necessary during normal operation of the device. According to another embodiment, the control unit 616 controls the actuator activation unit 695 of FIG. 1 so that the actuator unit 180 is switched on at time $t_0$.

According to an embodiment, the controller extension unit 600 comprises a pre-stage unit 640. The pre-stage unit 640 determines, from the measurement signal, whether the amplitude A of the residual oscillation falls below a minimal threshold $A_{xmin}$. If this is the case, it is to be assumed that the oscillator does not perform any significant residual movements anymore and that the oscillator may be started from its resting state without problems. According to an embodiment, the harmonic set point signal then starts with the initial amplitude $A_s = A_{xmin}$. The phasing during start from the state of rest is arbitrary and the frequency of the harmonic set point signal may be determined, for example, from knowledge of the temperature and a linear temperature model for the oscillator 190 or may be read out from the frequency storage unit 630. According to an embodiment, the pre-stage unit 640 determines a maximal value $A_{max}$ from several oscillation periods and a minimal value $A_{min}$ and calculates, from the values $A_{max}$ and $A_{min}$, rough values for the current oscillation amplitude A and a current oscillation offset. $A_0$ according to equations 1 and 2:

$$A = \frac{A_{max} - A_{min}}{2} \tag{1}$$

$$A_0 = \frac{A_{max} + A_{min}}{2} \tag{2}$$

The controller extension unit 600 is realized as a digital circuit (e.g. ASIC (application specific integrated circuit), DSP (digital signal processor) or FPGA (field programmable gate array)). Controller extension unit 600 and controller main unit 200 may be formed in the same or in different components. According to a further embodiment, the controller extension unit 600 and the controller main unit 200 are completely or partly programs performed from a computer or a microprocessor.

According to an embodiment, the filter unit 612 is a Kalman filter. The estimation of values of amplitude and phase is several magnitudes faster than the decay time constant of the oscillator. According to an embodiment, the movement y0 of the oscillator is therefore assumed to be an undamped harmonic oscillation:

$$y_0(t) = A \cdot \sin(\omega_{0M} t) \tag{3}$$

The measurement signal y*(t) contains, in addition to the actual oscillator movement y0, the unavoidable measurement noise w and the a constant offset A0.

$$y^* = y + A_0 = y_0 + w + A_0 \tag{4}$$

The oscillator movement y0(t) is the solution of the diferential equation system (equations (5) to (10)):

$$\dot{y}_0 = A \cdot \omega_{0M} \cos(\omega_{0M} t) \tag{5}$$

$$\ddot{y}_0 = -A \cdot \omega_{0M}^2 \cdot \sin(\omega_{0M} t) \tag{6}$$

$$x_1 = y_0 \tag{7}$$

$$x_2 = \dot{y}_0 \tag{8}$$

$$\dot{x}_1 = x_2 \tag{9}$$

$$\dot{x}_2 = -\omega_{0M}^2 x_1 \tag{10}$$

The state of this system can be represented by matrix notation as follows:

$$\underline{\dot{x}} = \begin{bmatrix} 0 & 1 \\ -\omega_{0M}^2 & 0 \end{bmatrix} \cdot \underline{x} = \underline{A} \cdot \underline{x} \tag{11}$$

In order to obtain a difference equation system, the above system is discretized with respect to the sampling T of the measurement signal. This is represented by means of Laplace transformation:

$$\underline{\phi}(s) = [s \cdot \underline{I} - \underline{A}]^{-1} \tag{12}$$

$$\underline{\phi}(s) = \begin{bmatrix} s & -1 \\ \omega_{0M}^2 & s \end{bmatrix}^{-1} = \begin{bmatrix} \dfrac{s}{s^2 + \omega_{0M}^2} & \dfrac{1}{s^2 + \omega_{0M}^2} \\ \dfrac{-\omega_{0M}^2}{s^2 + \omega_{0M}^2} & \dfrac{s}{s^2 + \omega_{0M}^2} \end{bmatrix} \tag{13}$$

$$\underline{\phi}(t) = \begin{bmatrix} \cos(\omega_{0M} \cdot t) & \dfrac{1}{\omega_{0M}} \cdot \sin(\omega_{0M} \cdot t) \\ -\omega_{0M} \cdot \sin(\omega_{0M} \cdot t) & \cos(\omega_{0M} \cdot t) \end{bmatrix} \tag{14}$$

$$\underline{\phi}(T) = \begin{bmatrix} \cos(\omega_{0M} \cdot T) & \dfrac{1}{\omega_{0M}} \cdot \sin(\omega_{0M} \cdot T) \\ -\omega_{0M} \cdot \sin(\omega_{0M} \cdot T) & \cos(\omega_{0M} \cdot T) \end{bmatrix} \tag{15}$$

Element for element, the difference equation system may be represented as follows:

$$x_1(k+1) = \cos(\omega_{0M} \cdot T) \cdot x_1(k) + \frac{1}{\omega_{0M}} \cdot \sin(\omega_{0M} \cdot T) \cdot x_2'(k) \tag{16}$$

$$x_2'(k+1) = -\omega_{0M} \cdot \sin(\omega_{0M} \cdot T) \cdot x_1(k) + \cos(\omega_{0M} \cdot T) \cdot x_2'(k) \tag{17}$$

In order to simplify calculation and implementation, it is preferable to normalize the state variables $x_2'$ with $\omega_{0M}$ as follows:

$$x_1(k+1) = \cos(\omega_{0M} \cdot T) \cdot x_1(k) + \sin(\omega_{0M} \cdot T) \cdot \frac{x_2'(k)}{\omega_{0M}} \tag{18}$$

$$\frac{x_2'(k+1)}{\omega_{0M}} = -\sin(\omega_{0M} \cdot T) \cdot x_1(k) + \cos(\omega_{0M} \cdot T) \cdot \frac{x_2'(k)}{\omega_{0M}} \tag{19}$$

With the new state variable $$x_2 = \frac{x_2'}{\omega_{0M}} \tag{20}$$

the description of state of the discretized system may be represented as follows:

$$\underline{x}(k+1) = \underline{\phi}(T) \cdot \underline{x}(k) = \begin{bmatrix} \cos(\omega_{0M} \cdot T) & \sin(\omega_{0M} \cdot T) \\ -\sin(\omega_{0M} \cdot T) & \cos(\omega_{0M} \cdot T) \end{bmatrix} \cdot \underline{x}(k) \tag{21}$$

$$y(k) = \underline{c}^T \cdot \underline{x}(k) + w(k) = [1 \; 0] \cdot \underline{x}(k) + w(k) \tag{22}$$

The symbol R is used in what follows for the variance of the measurement noise w.

Based on the noisy measurement values y* according to an embodiment a Kalman filter is used to obtain an estimation value $\hat{x}$ of the actual system state $\underline{x}$. The Kalman filter may be described by the following set of equations:

$$\underline{P}^*(0) = \begin{bmatrix} 1/2 & 0 \\ 0 & 1/2 \end{bmatrix} \underline{x}^*(0) = \begin{bmatrix} 0 \\ 0 \end{bmatrix} \quad (23)$$

$$\underline{k}(k) = \underline{P}^*(k) \cdot \underline{c} \cdot \{\underline{c}^T \cdot \underline{P}^*(k) \cdot \underline{c} + R\}^{-1} \quad (24)$$

$$\underline{\tilde{P}}(k) = \underline{P}^*(k) - \underline{k}(k) \cdot \underline{c}^T \cdot \underline{P}^*(k) \quad (25)$$

$$\underline{P}^*(k+1) = \underline{\phi} \cdot \underline{\tilde{P}}(k) \cdot \underline{\phi}^T \quad (26)$$

$$y(k) = y^*(k) - A_0 \quad (27)$$

$$\hat{\underline{x}}(k) = \underline{x}^*(k) + \underline{k}(k) \cdot \{y(k) - \underline{c}^T \cdot \underline{x}^*(k)\} \quad (28)$$

$$\underline{x}^*(k+1) = \underline{\phi} \cdot \hat{\underline{x}}(k) \quad (29)$$

By considering, element by element, the Kalman filter equations may be represented by equations (30) to (42) as follows. (The symmetry of the matrices $\underline{P}^*$ and $\tilde{P}$ has been employed):

$$k_1(k) = \frac{P_{11}^*(k)}{P_{11}^*(k) + R} \quad (30)$$

$$k_2(k) = \frac{P_{12}^*(k)}{P_{11}^*(k) + R} \quad (31)$$

$$\tilde{P}_{11}(k) = P_{11}^*(k) - P_{11}^*(k) \cdot k_1(k) \quad (32)$$

$$\tilde{P}_{12}(k) = P_{12}^*(k) - P_{11}^*(k) \cdot k_2(k) \quad (33)$$

$$\tilde{P}_{22}(k) = P_{22}^*(k) - P_{12}^*(k) \cdot k_2(k) \quad (34)$$

$$P_{11}^*(k+1) = \cos^2(\omega_{0M} \cdot T) \cdot \tilde{P}_{11}(k) + \quad (35)$$
$$2 \cdot \cos(\omega_{0M} \cdot T) \cdot \sin(\omega_{0M} \cdot T) \cdot \tilde{P}_{12}(k) + \sin^2(\omega_{0M} \cdot T) \cdot \tilde{P}_{22}(k)$$

$$P_{12}^*(k+1) = -\cos(\omega_{0M} \cdot T) \cdot \sin(\omega_{0M} \cdot T) \cdot \tilde{P}_{11}(k) + \quad (36)$$
$$(\cos^2(\omega_{0M} \cdot T) - \sin^2(\omega_{0M} \cdot T)) \cdot \tilde{P}_{12}(k) +$$
$$\cos(\omega_{0M} \cdot T) \cdot \sin(\omega_{0M} \cdot T) \cdot \tilde{P}_{22}(k)$$

$$P_{22}^*(k+1) = \sin^2(\omega_{0M} \cdot T) \cdot \tilde{P}_{11}(k) - \quad (37)$$
$$2 \cdot \cos(\omega_{0M} \cdot T) \cdot \sin(\omega_{0M} \cdot T) \cdot \tilde{P}_{12}(k) + \cos^2(\omega_{0M} \cdot T) \cdot \tilde{P}_{22}(k)$$

$$y(k) = y^*(k) - A_0 \quad (38)$$

$$\hat{x}_1(k) = x_1^*(k) + k_1(k) \cdot (y(k) - x_1^*(k)) \quad (39)$$

$$\hat{x}_2(k) = x_2^*(k) + k_2(k) \cdot (y(k) - x_1^*(k)) \quad (40)$$

$$x_1^*(k+1) = \cos(\omega_{0M} \cdot T) \cdot \hat{x}_1(k) + \sin(\omega_{0M} \cdot T) \cdot \hat{x}_2(k) \quad (41)$$

$$x_2^*(k+1) = -\sin(\omega_{0M} \cdot T) \cdot \hat{x}_1(k) + \cos(\omega_{0M} \cdot T) \cdot \hat{x}_2(k) \quad (42)$$

The zero crossing from negative to positive values of the estimated signals is used to begin the set signal of the amplitude control in proper phase. The time zero is chosen such that it coincides with the detected zero crossing. The estimated signal is then proportional to $\sin(\omega_{0M} \cdot T \cdot k)$.

The set point signal of the amplitude control should start in exactly the zero crossing of the estimated signal with the initial phase 0. But as only sampling values with a temporal resolution of T are available, the zero crossing may not be met exactly in general. According to an embodiment, for this reason a phase $\Delta\phi_0$ to be taken into account is additionally determined from the sampling value $\hat{x}_{1,0}$ previous to zero crossing and the sampling value $\hat{x}_{1,1}$ after the zero crossing by linear interpolation according to equation (43):

$$\Delta\varphi_0 = \frac{\hat{x}_{1,1}}{\hat{x}_{1,1} - \hat{x}_{1,0}} \cdot \omega_{0M} \cdot T \quad (43)$$

This phase becomes effective only in the following cycle, which leads to an additional delay to be considered. Moreover, further delays depending on realization have to be considered during signal processing (e.g. during capture of measurement values). These further delays in multiples of the sampling time are assumed to be $n_{osc}$. The necessary initial phase $\phi_0$ is then according to equation (44):

$$\varphi_0 = \quad (44)$$
$$\Delta\varphi_0 + (n_{osc} + 1) \cdot \omega_{0M} \cdot T = \frac{\hat{x}_{1,1}}{\hat{x}_{1,1} - \hat{x}_{1,0}} \cdot \omega_{0M} \cdot T + (n_{osc} + 1) \cdot \omega_{0M} \cdot T$$

Figure 2B:
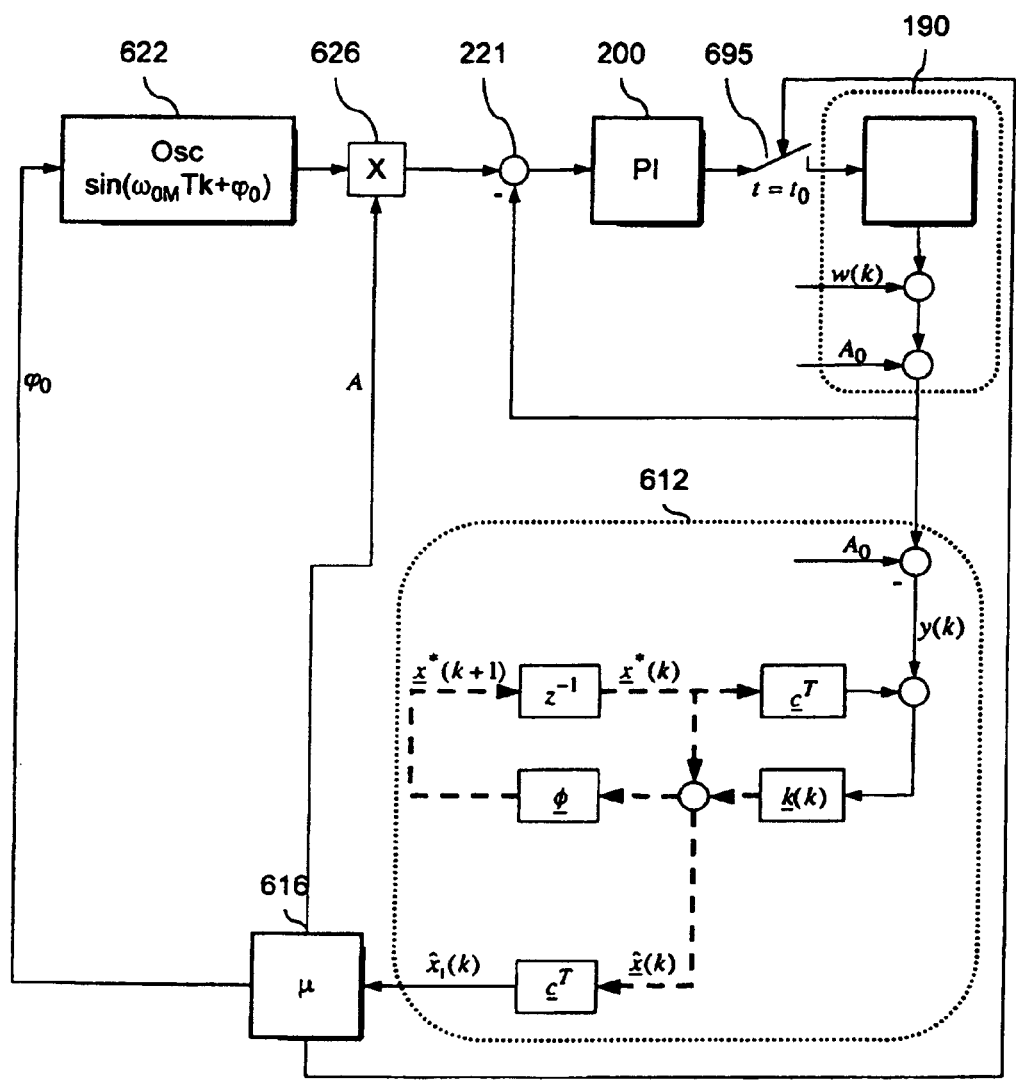
FIG. 2B is a block diagram with further details of the controller extension unit of FIG. 2A according to another embodiment.

FIG. 2B illustrates details of a Kalman filter as filter unit 612 of a control device.

If the system consists of several oscillators and the drives of the oscillators have to be started together because of common electronics (e.g. in an inertial measurement unit (IMU) consisting of three rotation rate sensors) the zero crossings of the oscillators do not have to happen within the same sampling cycle necessarily. For this reason the starting phase for those oscillators, which have already had their zero crossings, is increased by $\omega_{0M} \cdot T$ for each additional sampling cycle. This is performed until the last oscillator has had its zero crossing.

For example, as soon as the synchronization condition (the zero crossing of the measured oscillator signal) has been detected for at least one of these sensors, the drive of this sensor is started according to the above-described method. The switch-on of the remaining sensors may then be performed as soon as their individual synchronization conditions are satisfied. The time for switching on the drive is individually chosen for all sensors in this process. According to another embodiment with common electronics for which only a common switch-on time of the drive is possible, it is delayed until the synchronization conditions for all sensors are detected. As the synchronization conditions per sampling cycle can be evaluated once, for each sensor whose synchronization condition was already obtained, the phase $\omega_{0M} \cdot T$ corresponding to the sampling cycle is added to the starting phase for each additional sampling cycle.

Figure 3A:
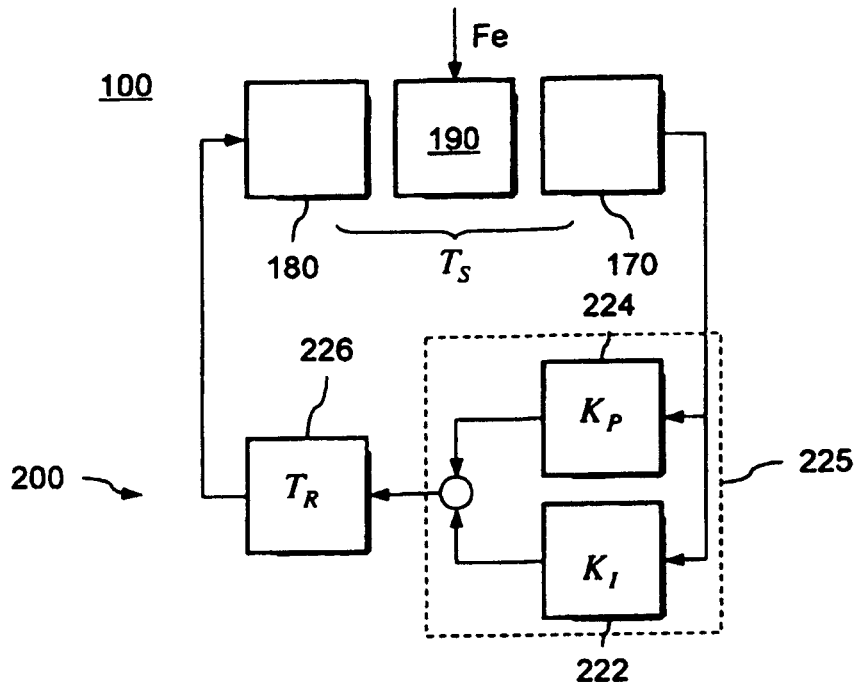
FIG. 3A illustrates a schematic block diagram of a device with a control device according to an embodiment, which refers to a controller main unit with a continuous PI controller for harmonic set point signals and a dead time element.

The embodiment illustrated in FIG. 3A describes the mode of operation in order to clarify the principle on which the controller main unit 200 is based, an analog embodiment of the controller main unit 200 within a device 100. The controller main unit 200 comprises a PI controller 225 for harmonic command variables or harmonic set point signals with an integrating transfer element 222 having an integral action coefficient $K_i$ and a proportional transfer element 224 with an amplification factor $K_p$. The PI controller 225 for harmonic command variables generates a harmonic oscillation with the same frequency and time proportional amplitude at the controller output from a harmonic oscillation of constant amplitude at the controller input.

Figure 3B:
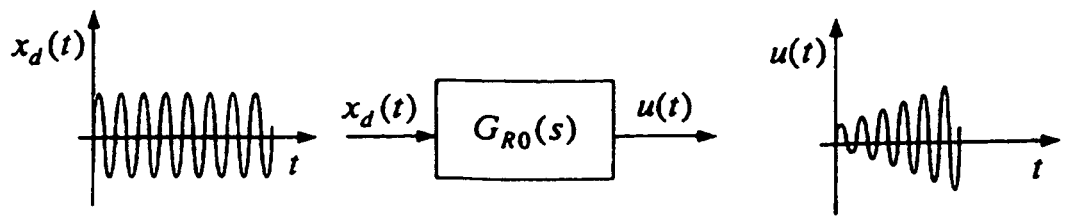
FIG. 3B schematically illustrates the transfer function of the PI controller according to FIG. 3A.

FIG. 3B illustrates the transformation of a sine wave modulated step function signal $x_d(t)$ into a harmonic output signal u(t) with time proportional amplitude by the transfer function $G_{RO}(s)$ of the PI-controller 225. The described behavior of the PI-controller requires dimensioning of the controller parameters $K_i$, $K_p$ as subsequently described.

Equation (45) gives the relation between the controller output signal u(t) and the controller input signal $x_d(t)$ for $x_d(t)=\sigma(t)$:

$$u(t)=(K_P+K_I t)\cdot\sin(\omega_0\cdot t)\cdot\sigma(t). \tag{45}$$

The Laplace transform of the controller output signal u(t) and controller input signal $x_d(t)$ result from equations (46a) and (46b):

$$X_d(s) = \frac{\omega_0}{s^2 + \omega_0^2} \tag{46a}$$

$$U(s) = K_P\cdot\frac{\omega_0}{s^2 + \omega_0^2} + K_I\cdot\frac{2\cdot\omega_0\cdot s}{(s^2 + \omega_0^2)^2}. \tag{46b}$$

The transfer function $G_{R0}(s)$ of the PI-controller 225 for harmonic set point signals results thus from equation (47):

$$G_{R0}(s) = \frac{U(s)}{X_d(s)} = K_P\cdot\frac{s^2 + 2\cdot\frac{K_I}{K_P}\cdot s + \omega_0^2}{s^2 + \omega_0^2} \tag{47}$$

Characteristic of the continuous PI-controller 225 is a conjugate complex pole at $s=\pm j\omega_0$ resulting from the generalized integral component. With a harmonic oscillation of frequency $\omega_0$ at the controller input, the PI-controller 225 generates no phase shift at the controller output. The controller main unit 200 includes an additional delay 226 with the controller dead time $T_R$ in series to the PI-controller 225 for adjusting an arbitrary phase. The controller transfer function $G_R(s)$ of the controller main unit 200 results thus from equation (48):

$$G_R(s) = G_{R0}(s)\cdot e^{-T_R\cdot s} = K_P\frac{s^2 + 2\cdot\frac{K_I}{K_P}\cdot s + \omega_0^2}{s^2 + \omega_0^2}\cdot e^{-T_R\cdot s} \tag{48}$$

The controller parameters $K_i$, $K_p$ are chosen so that the controller zeros in the controller transfer functions according to equation (48) compensate the conjugate complex system pole in the system transfer functions according to equation (49).

$$G(s) = \frac{A}{(s+s_o)^2 + \omega_o^2}\cdot e^{-T_S\cdot s} = G_o(s)\cdot e^{-T_S\cdot s} \tag{49}$$

By equating the coefficients of equations (45) and (49) for determining the controller parameters $K_i$, $K_p$ the equations (50a) and (50b) result:

$$2\cdot\frac{K_I}{K_P} \stackrel{!}{=} 2\cdot s_0 \tag{50a}$$

$$\omega_0^2 \stackrel{!}{=} \omega_o^2 + s_0^2. \tag{50b}$$

According to one embodiment, the damping $s_0$ and the resonance angular frequency $\omega_0$ of the oscillator 190 are chosen such that $s_0 \ll \omega_0$ is satisfied and hence equation (50b) is satisfied to a very good approximation. Equation (50c) follows from equation (50a) as dimensioning rule for the ratio of the integral action coefficient $K_I$ to the amplification factor $K_P$:

$$\frac{K_I}{K_P} \stackrel{!}{=} s_0. \tag{50c}$$

The transfer function $G_k(s)$ of the corrected open loop results from the product of the system transfer function $G_s(s)$ and the controller transfer function $G_R(s)$. As the expression for the conjugate complex system pole and the conjugate complex controller zeros cancel by appropriate dimensioning according to equations (50b), (50c), the transfer function $G_k(s)$ of the corrected open loop results from equation (51):

$$G_k(s) = G_S(s)\cdot G_R(s) = A\cdot K_P\cdot\frac{1}{s^2 + \omega_o^2}\cdot e^{-(T_S+T_R)\cdot s} \tag{51}$$

By feedback control with a conventional PI-controller, a phase jump from +90° to −90° occurs in the phase frequency response of the corrected open loop at frequency ω=0. In contrast, in the PI-controller 225 designed for harmonic command variables, a 180° phase jump occurs at the frequency $\square_0$, that is not necessarily between +90° and −90°. According to one embodiment, the controller delay $T_R$ is therefore chosen so that the 180° phase jump occurs as close as possible to $\omega_0$, for example by dimensioning the controller parameters according to equation (52a):

$$(T_S + T_R)\cdot\omega_0 = \frac{3}{2}\cdot\pi \tag{52a}$$

If the phase shift produced by the system dead time $T_s$ alone at $\omega_0$ is smaller than 90°, then a phase ratio of 180° can be generated by an inverting controller. In this case the phases produced by the controller delay $T_R$ and the system delay $T_S$ at $\omega_0$, respectively, have to add merely to π/2. The dimensioning rule for the controller delay $T_R$ is then:

$$(T_S + T_R)\cdot\omega_0 = \frac{\pi}{2}. \tag{52b}$$

The stability properties of the closed loop can be deduced via the Nyquist criterion from the frequency response of the corrected open loop. The corrected open loop consists of the generalized integrator and the combination of system delay $T_s$ and controller delay $T_R$. By appropriate dimensioning of the controller delay $T_R$ according to equations (52a) or (52b) the phase characteristics at the frequency $\omega_0$ has a 180° jump between +90° for lower frequencies $\omega<\omega_0$ to −90° to higher frequencies $\omega>\omega_0$. The transfer function $G_w(s)$ of the closed loop results from the one of the corrected open loop $G_k(s)$.

$$G_w(s) = \frac{G_k(s)}{1 + G_k(s)}. \tag{53}$$

When the controller delay $T_R$ is determined according to equation (52a) the closed loop is then exactly stable when the locus of the corrected open loop neither encloses nor runs through the point −1 for $0 \leq \omega < \omega_0$.

When, in contrast, the controller delay $T_P$ is determined according to equation (52b) and when the PI-controller 225 generates a 180° phase the closed loop is then exactly stable when the locus of the corrected open loop at a negative real axis starts at a value larger than −1.

In the interval $0 \leq \omega < \omega_0$ the absolute value characteristic intersects the 0 dB line at the gain crossover frequency, wherein the frequency difference from $\omega_0$ at the gain crossover frequency determines the bandwidth of the closed loop. The absolute value frequency response and, hence, the gain crossover frequency can be shifted along the ordinate via the amplification factor $K_P$ so the resulting bandwidth of the closed loop is adjustable. According to one embodiment, the amplification factor $K_P$ is chosen such that the bandwidth is maximal within the limits given by the stability criteria.

In summary, the controller main unit 200 comprises a PI-controller 225 for harmonic command variables, which is supplied with a harmonic set point signal and which comprises a proportional transfer element 224 with amplification factor $K_P$ and an integrating transfer element 222 with an integral action coefficient $K_I$. The integral action coefficient $K_I$ and the amplification factor $K_P$ are chosen so that, in the s-plane, the zero of the controller transfer function of the PI-controller 225 and the conjugated complex pole of the oscillator 190 describing the system transfer function compensate.

According to one embodiment, the damping $s_0$ of the oscillator 190 with respect to the deflection in the direction of excitation is very much smaller than the resonance angular frequency $\omega_0$ of the oscillator 190 and the ratio of the integral action coefficient $K_I$ to the amplification factor $K_P$ in $\sec^{-1}$ corresponds approximately to the damping $s_0$. Moreover, the amplification factor $K_P$ can be chosen such that the resulting bandwidth is as high as possible for the respective stability requirements. The integral action coefficient $K_I$ is then chosen in dependence from the damping $s_0$ and the amplification factor $K_P$ according to equation (12c).

According to one embodiment, the system formed by the actuator 180, the oscillator 190 and the sensor unit 170 has a system delay $T_S$ and the controller main unit 200 has a delay element 226 with the controller delay $T_R$ acting serially to the PI-controller 225. The controller delay $T_R$ is chosen in dependence upon the resonance frequency $\omega_0$ of the oscillator 190 and the system delay $T_S$ is chosen so that the phase frequency response of the corrected open loop at the frequency $\omega_0$ has a phase jump from +90° to −90° towards higher frequencies.

According to a first variant of this embodiment, the PI-controller for harmonic command variables does not flip the sign and the controller delay $T_R$ is chosen so that the product of the resonance angular frequency $\omega_0$ and the sum of system delay $T_S$ and controller delay $T_R$ is $3\pi/2$. According to another variant of this embodiment, the PI-controller 225 inverts the sign, shifts the phase about 180°, and the phase effected by the controller delay $T_R$ and the system delay $T_s$ at the resonance angular frequency $\omega_0$ merely adds to $\pi/2$ so that the product of the resonance angular frequency $\omega_0$ and the sum of system delay $T_S$ and controller delay $T_R$ is $\pi/2$ as a result.

As the controller main unit 200 provides no baseband transformation (which requires a low pass filter for damping higher frequency conversion products) the controller main unit 200 can be formed with a considerable broader band. The controller main unit 200 reacts faster to disturbances than comparable controllers that provide a baseband transformation.

Figure 4A:
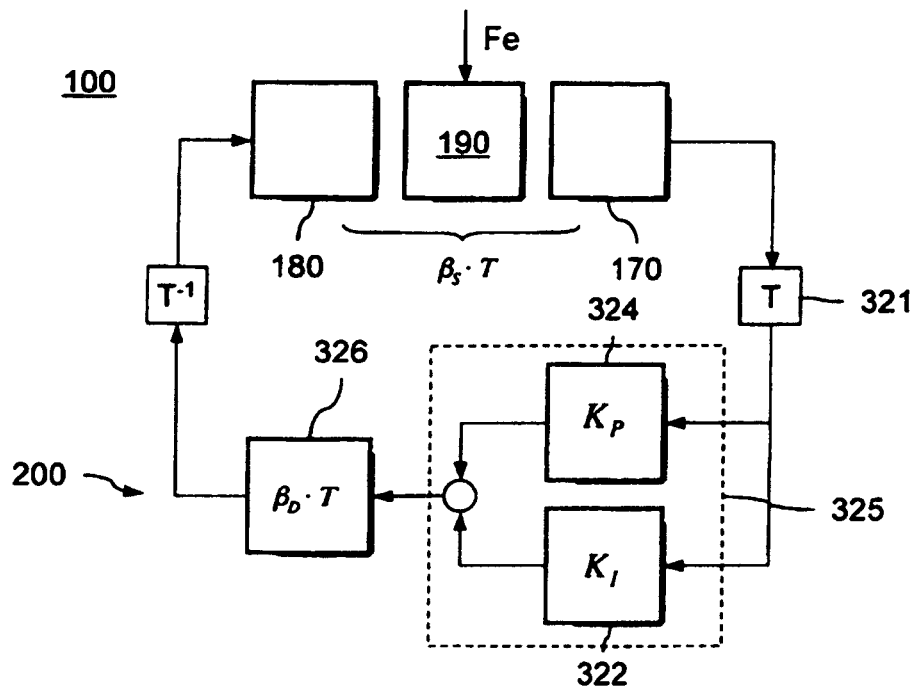
FIG. 4A is a schematic block diagram of a device with a control device according to an embodiment which refers to a controller main unit with a discrete PI controller for harmonic set point signals and a dead time element.
Figure 4B:
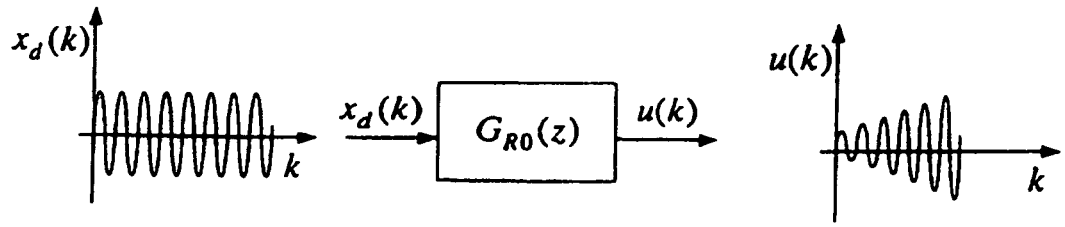
FIG. 4B schematically illustrates the transfer function of the controller main unit of FIG. 4A.

FIGS. 4A and 4B refer to an embodiment in which the controller main unit 200 has a discrete PI-controller 325 for harmonic set point signals with a discrete proportional transfer element 324 of amplification factor $K_P$ and a discrete integrating transfer element 322 with integral action coefficient $K_I$. According to the embodiment, the analog measurement signal output by the sensor unit 170 is sampled with a sampling time T by a sampling unit 321 and converted into a digital input signal for the discrete PI-controller 325. According to another embodiment, the sensor unit already outputs a digital measurement signal.

According to an embodiment in which the system including the actuator 180, the oscillator 190 and the sensor unit 170 has a system delay $T_S$, the controller main unit 200 includes a delay element 326 arranged in series with the discrete PI-controller 325 with a controller delay $T_R$. In what follows the system delay $T_S$ as well as the controller delay $T_R$ are expressed as multiplies of the sampling time T according to the equations (54a) and (54b):

$$T_S = \beta_S \cdot T \quad (54a)$$

and $$T_R = \beta_D \cdot T. \quad (54b)$$

In this process the controller delay $T_R$ is determined such that the corrected open loop has a phase jump at the resonance angular frequency $\omega_0$ from +90° and −90° towards higher frequencies.

According to one embodiment, the ratio of the integral action coefficient $K_I$ to the amplification factor $K_P$ is adjusted so that the controller zero of the controller transfer function compensates the conjugate complex system pole of the system transfer function in the s-plane. According to another embodiment, the controller parameters are chosen so that the transfer function of the closed loop of an equivalent baseband system has a double real eigenvalue. The controller main unit 200 is realized, for example, as a digital circuit (ASIC (application specific integrated circuit), DSP (digital signal processor) or FPGA (Field Programmable Gate Array)) or as a program for a computer or microprocessor.

FIG. 4B illustrates the z-transfer function $G_{R0}(z)$ of the discrete PI-controller 325 for harmonic command variables according to FIG. 4A. The transfer function $G_{R0}(z)$ is determined so that the PI-controller 325 generates, from an input signal $x_d(k)$ including a harmonic oscillation modulated with the step function $\sigma(k)$, a harmonic oscillation of the same frequency with a time proportional amplitude as controller output signal $u(k)$ as expressed by equation (55):

$$u(k) = (K_P + K_I \cdot T \cdot k) \cdot \sin(\omega_0 \cdot T \cdot k) \cdot \sigma(k) \quad (55)$$

The input function $X_d(z)$ and the output function $U(z)$ result from z-transformations according to equations (56a) and (56b):

$$X_d(z) = \frac{z \cdot \sin(\omega_0 \cdot T)}{z^2 - 2 \cdot \cos(\omega_0 \cdot T) \cdot z + 1} \quad (56a)$$

$$U(z) = K_P \cdot \frac{z \cdot \sin(\omega_0 \cdot T)}{z^2 - 2 \cdot \cos(\omega_0 \cdot T) \cdot z + 1} + K_I \cdot \frac{T \cdot z^3 \cdot \sin(\omega_0 \cdot T) - T \cdot z \cdot \sin(\omega_0 \cdot T)}{(z^2 - 2 \cdot \cos(\omega_0 \cdot T) \cdot z + 1)^2} \quad (56b)$$

The resulting transfer function $G_{R0}(z)$ of the discrete PI-controller 325 for harmonic command variables is then, from equation (56c):

$$G_{R0}(z) = \frac{U(z)}{X_d(z)} = \frac{(K_P + K_I \cdot T) \cdot z^2 - 2 \cdot K_P \cdot \cos(\omega_0 \cdot T) \cdot z + K_P - K_I \cdot T}{z^2 - 2 \cdot \cos(\omega_0 \cdot T) \cdot z + 1} \quad (56c)$$

Because of the generalized integral portion, such a discrete PI-controller has a pole at $z=e^{\pm j\cdot\omega_0 \cdot T}$ and generates, with a harmonic oscillation of the frequency $\omega_0$ at the input, no phase shift at the output. To be able to adjust an arbitrary phase, the controller main unit 200 is provided with a delay element 326 with retardation $\beta_0$ according to one embodiment. The controller transfer function $G_R(z)$ of the controller main unit 200 with the delay element 326 and the discrete PI-controller 325 result then from the equation (57):

$$G_R(z) = G_{R0}(z) \cdot z^{-\beta_D} = \quad (57)$$
$$\frac{(K_P + K_I \cdot T) \cdot z^2 - 2 \cdot K_P \cdot \cos(\omega_0 \cdot T) \cdot z + K_P - K_I \cdot T}{z^2 - 2 \cdot \cos(\omega_0 \cdot T) \cdot z + 1} \cdot z^{-\beta_D}.$$

The model of the continuous controlled system according to equation (49) accordingly must be discretized. To this end, in the transfer function G(s) of the controlled system according to equation (49) the system delay $T_S$ is at first expressed as a multiple of the sampling time T according to equation (54a):

$$G(s) = \frac{A}{(s+s_0)^2 + \omega_0^2} \cdot e^{-\beta_S T_S} = G_0(s) \cdot e^{-\beta_S T_S} \quad (58)$$

A step transfer function G(z) of a discretized model of a continuous controlled system with the transfer function G(s) can generally be calculated according to equation (59):

$$G(z) = \frac{z-1}{z} \cdot Z\left\{\frac{G(s)}{s}\right\} \quad (59)$$

With the following abbreviations according to equations (59a) to (59e)

$$K_S = \frac{A}{s_0^2 + \omega_0^2} \quad (59a)$$

$$b_1 1 - e^{-s_0 \cdot T} \cdot \cos(\omega_0 \cdot T) - \frac{s_0}{\omega_0} \cdot e^{-s_0 \cdot T} \cdot \sin(\omega_0 \cdot T) \quad (59b)$$

$$b_2 = e^{-2 \cdot s_0 \cdot T} - e^{-s_0 \cdot T} \cdot \cos(\omega_0 \cdot T) + \frac{s_0}{\omega_0} \cdot e^{-s_0 \cdot T} \cdot \sin(\omega_0 \cdot T) \quad (59c)$$

$$a_1 = 2 \cdot e^{-s_0 \cdot T} \cdot \cos(\omega_0 \cdot T) \quad (59d)$$

$$a_2 = -e^{-2 \cdot s_0 \cdot T} \quad (59e)$$

the step transfer function G(z) for the oscillator 190 results from the equations (58) and (59) according to equation (60) below:

$$G(z) = K_S \cdot \frac{b_1 \cdot z + b_2}{z^2 - a_1 \cdot z - a_2} \cdot \frac{1}{z^{\beta_S}} = G_0(z) \cdot \frac{1}{z^{\beta_S}} \quad (60)$$

According to one embodiment of the invention, the controller delay $T_R$ is determined such that the phase frequency response of the corrected open loop has a phase jump from $+90°$ to $-90°$ towards higher frequencies at the resonance angular frequency $\omega_0$. The z-transfer function for the corrected open loop results, in analogy to equation (51), from multiplication of the system transfer function G(z) according to equation (58) with the controller transfer function $G_R(z)$ according to equation (57):

$$G_K(z) = G_0(z) \cdot G_{R0}(z) \cdot z^{-(\beta_g + \beta_D)} \quad (61)$$

Analogous to the equations (52a) and (52b), the controller parameter $\beta_D$ is chosen such that the transfer function of the corrected open loop $G_K(z)$ has a phase jump from $+90°$ to $-90°$ at the resonance angular frequency $\omega_0$:

$$\left(\beta_S + \beta_D + \frac{1}{2}\right) \cdot \omega_0 \cdot T = \frac{3}{2} \cdot \pi \quad (62a)$$

In comparison with equation (52a), one finds an additional part $\frac{1}{2}\omega_0 T$ with respect to the continuous controller, which expresses a delay, which can be traced back to the discretizing of an additional half sampling cycle. As in the case of the continuous controller, a phase jump of 180° can be generated by a minus sign in the controller, provided that the phase shift generated by the system dead time $\beta_S \cdot T$ and the discretization, respectively, are smaller than 90° at the resonance angular frequency $\omega_0$. In this way, the phases generated by the discretization, the controller dead time $\beta_D \cdot T$ and the system dead time $\beta_S \cdot T$, need merely to add up to $\pi/2$. Accordingly, the dimensioning rule for $\beta_D$ results in this case from equation (62b):

$$\left(\beta_S + \beta_D + \frac{1}{2}\right) \cdot \omega_0 \cdot T = \frac{\pi}{2}. \quad (62b)$$

The equations (62a) and (62b) normally lead to a non-integral value for $\beta_D$. Generally, the controller parameter $\beta_D$ has an integral part $n_D$ and a rest $1/a_D$ with $a_D > 1$ according to equation (63):

$$\beta_D = n_D + \frac{1}{a_D} \quad (63)$$

According to one embodiment, the integral part $n_D$ can be approximated by a delay chain in accordance with the length denoted by $n_D$ and the fraction $1/a_D$ of a sampling cycle can be approximated by an all-pass filter of first order according to equation (64):

$$z^{-\frac{1}{a_D}} \approx \frac{\alpha_D \cdot z + 1}{z + \alpha_D} \quad (64)$$

According to one embodiment, the parameter $\alpha_D$ of the all-pass filter is chosen such that the phase of the exact transfer function $z^{-\alpha_D^{-i}}$ and the phase of the all-pass approximation according to equation (64) coincide at the resonance angular frequency $\omega_0$ as far as possible. From these conditions, equation (65) results as a conditional equation for the parameter $\alpha_D$ of the all-pass filter:

$$-\frac{\omega_0 \cdot T}{a_D} = \arctan\left(\frac{\alpha_D \cdot \sin(\omega_0 \cdot T)}{\alpha_D \cdot \cos(\omega_0 \cdot T) + 1}\right) - \arctan\left(\frac{\sin(\omega_0 \cdot T)}{\cos(\omega_0 \cdot T) + \alpha_D}\right) \quad (65)$$

According to one embodiment, $\alpha_D$ is determined such that, via nested intervals, the zeros of the function according to equation (66) are determined:

$$f(\alpha_D) = \qquad (66)$$
$$\arctan\left(\frac{\alpha_D \cdot \sin(\omega_0 \cdot T)}{\alpha_D \cdot \cos(\omega_0 \cdot T) + 1}\right) - \arctan\left(\frac{\sin(\omega_0 \cdot T)}{\cos(\omega_0 \cdot T) + \alpha_D}\right) + \frac{\omega_0 \cdot T}{a_D}$$

The determination of $n_D$ and $a_D$ according to equations (63) and (66) is independent of the determination of the further controller parameters $K_P$ and $K_I$.

According to one embodiment of a method for manufacturing a controller unit which includes the dimensioning of the discrete PI-controller 325 according to FIG. 4A, the amplification factor $K_P$ and the integral action coefficient $K_I$ of the discrete PI-controller 325 are chosen so that the controller zeros in the controller transfer function $G_R(z)$ according to equation (57) compensate the conjugate complex system pole of the system transfer function $G(z)$ according to equation (60). Equating coefficients of equations (57) and (60) with respect to $z^1$ leads to the dimensioning rule according to equation (67):

$$K_P \stackrel{!}{=} K_I \cdot T \cdot \frac{e^{-s_0 \cdot T}}{1 - e^{-s_0 \cdot T}}. \quad (67)$$

Equating coefficients with respect to $z^0$ leads to the dimensioning rule according to equation (68):

$$K_P \stackrel{!}{=} K_I \cdot T \cdot \frac{1 + e^{-2 \cdot s_0 \cdot T}}{1 - e^{-2 \cdot s_0 \cdot T}}. \quad (68)$$

According to one embodiment, the damping $s_0$ of the oscillator 190 and the sampling time T are chosen such that $s_0 \cdot T \ll 1$ holds so that the approximations according to (69a) and (69b) are sufficiently exact:

$$e^{-s_D \cdot T} \approx 1 - s_0 \cdot T \quad (69a)$$

$$e^{-2 \cdot s_0 \cdot T} \approx 1 - 2 \cdot s_0 \cdot T \quad (69b)$$

With the approximations according to equations (69a) and (69b), the two independent dimensioning rules according to equations (67) and (68) can be approximated by a single dimensioning rule according to equation (70):

$$K_P \stackrel{!}{=} K_I \cdot T \cdot \frac{1 - s_0 \cdot T}{s_0 \cdot T}, \quad (70)$$
respectively $$K_I \cdot T \stackrel{!}{=} K_P \cdot s_0 \cdot T.$$

According to one embodiment, the ratio of the integral action coefficient $K_I$ to the amplification factor $K_P$ is set equal or nearly equal to the damping $s_0$ of the oscillator. The dimensioning of the discrete PI-controller 325 according to the described method, which includes the compensation of the system pole by the controller zero, leads to a good reference action of the closed loop.

Figure 5A:
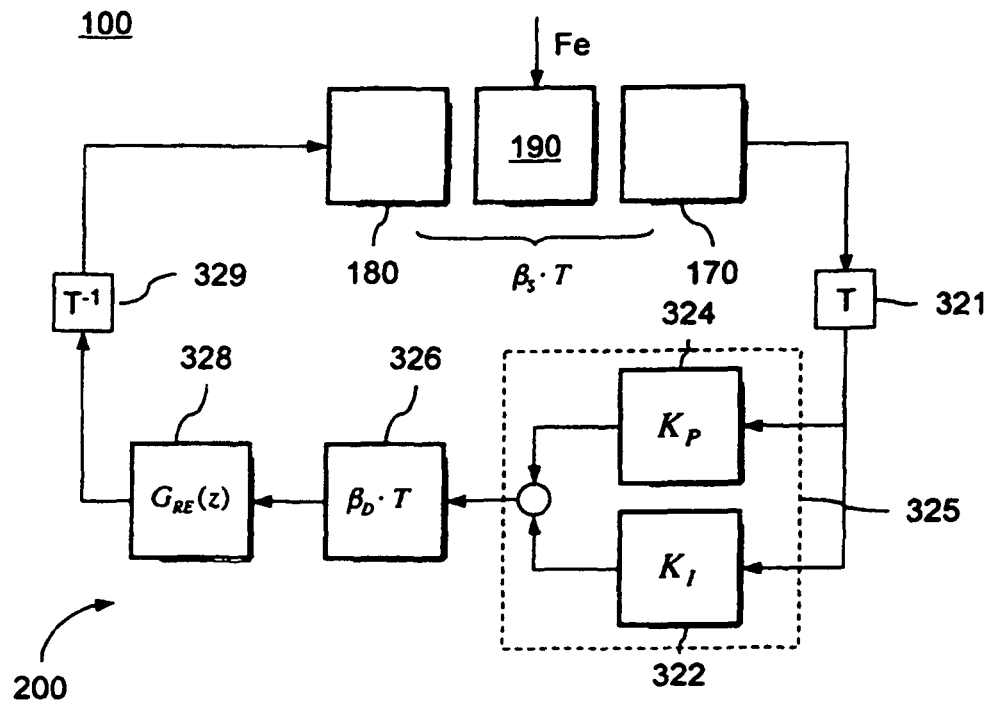
FIG. 5A is a schematic block diagram of a device with a control device according to an embodiment, which refers to a controller main unit with a discrete PI controller for harmonic set point signals and a controller extension working similarly to band pass.
Figure 5B:
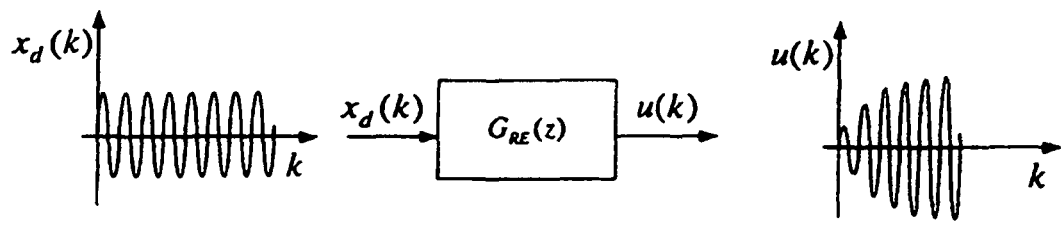
FIG. 5B schematically illustrates the transfer function of the controller extension of FIG. 5A.

FIGS. 5A and 5B refer to an embodiment in which the controller main unit 200 has a controller extension 328, which is arranged in series with the PI-controller 325 and the delay element 326 according to FIG. 4A. In the following, the structure of the controller extension 328 is deduced from an analog controller extension for the baseband.

For example, the oscillator 190 can possess other resonances than the resonance angular frequency at $\omega_0$, such as mechanical structure resonances above or below the resonance angular frequency $\omega_0$. The controller extension 328 is formed such that these further resonances are damped more strongly. To this end, a delay element of first order ($PT_1$-element) with a further pole at the kink frequency beyond the desired bandwidth would be added to a conventional PI-controller in the baseband. This additional controller pole causes the controller to no longer act as a proportional element for high frequencies, but its absolute frequency value drops 20 db/decade. The step response y(k) of such an extension in the baseband results from the step function σ(k) as input signal u(k) according to equation (71):

$$y(k) = \left(1 - e^{-\frac{k \cdot T}{T_1}}\right) \cdot \sigma(k) \quad (71)$$

The z transform U(z) of the input signal u(k) Corresponds to the z transform of the step signal:

$$U(z) = \frac{z}{z - 1} \quad (72a)$$

The z transform Y(z) of the output signal y(k) results from equation (72b):

$$Y(z) = \frac{z}{z - 1} - \frac{z}{z - e^{-\frac{T}{T_1}}} \quad (72b)$$

Analogous to equation (47) for the transfer function $G_{RE0}(z)$ of such a controller extension in the baseband results thusly:

$$G_{RE0}(z) = \frac{1 - e^{-\frac{T}{T_1}}}{z - e^{-\frac{T}{T_1}}} \quad (73)$$

According to one embodiment, the controller extension 328 in the bandpass band is configured now in analogy to the controller extension in the baseband such that the controller extension 328 responds with a harmonic oscillation of resonance angular frequency $\omega_0$ modulated by the step function with a harmonic oscillation of the same frequency, wherein the step response of the baseband extension defines the envelope as it is illustrated on the right side of FIG. 5B.

FIG. 5B illustrates the transformation of a sine modulated step function u(k) onto an output signal with a sine oscillation whose envelope results from the step response according to the transfer function $G_{RE0}(z)$ of the discrete controller extension in the bandpass band. The input signal of the controller extension 328 in the bandpass band with the transfer function results from equation (74):

$$u(k) = \sin(\omega_0 \cdot T \cdot k) \cdot \sigma(k) \quad (74)$$

The controller output signal y(k) is a harmonic oscillation whose envelope corresponds to the step response of the $PT_1$-controller extension in the baseband:

$$y(k) = \left(1 - e^{-\frac{k \cdot T}{T_1}}\right) \cdot \sin(\omega_0 \cdot T \cdot k) \cdot \sigma(k) \quad (75)$$

The z transforms U(z) and Y(z) result from equations (76a) and (76b):

$$U(z) = \frac{z \cdot \sin(\omega_0 \cdot T)}{z^2 - 2 \cdot \cos(\omega_0 \cdot T) \cdot z + 1} \quad (76a)$$

$$Y(z) = z \cdot \frac{\sin(\omega_0 \cdot T)}{z^2 - 2 \cdot \cos(\omega_0 \cdot T) \cdot z + 1} - z \cdot \frac{e^{-\frac{T}{T_1}} \cdot \sin(\omega_0 \cdot T)}{z^2 - 2 \cdot e^{-\frac{T}{T_1}} \cdot \cos(\omega_0 \cdot T) \cdot z + e^{-2\frac{T}{T_1}}} \quad (76b)$$

The transfer function $G_{RE}(z)$ of the controller extension 328 for the bandpass band results from equation (77):

$$G_{RE}(z) = \frac{Y(z)}{U(z)} = \frac{\left(1 - e^{-\frac{T}{T_1}}\right) \cdot z^2 - e^{-\frac{T}{T_1}} \cdot \left(1 - e^{-\frac{T}{T_1}}\right)}{z^2 - 2 \cdot e^{-\frac{T}{T_1}} \cdot \cos(\omega_0 \cdot T) \cdot z + e^{-2\frac{T}{T_1}}} \quad (77)$$

The controller extension 328 with the transfer function $G_{RE}(z)$ acts similarly in series with the discrete PI-controller 325 to a bandpass of first order with the resonance frequency $\omega_0$ as midband frequency. Absolute value and phase of the corrected open loop at the resonance angular frequency $\omega_0$ remain unchanged in a narrow region around the resonance angular frequency $\omega_0$ according to equation (78).

$$\omega_0 - \frac{1}{T_1} \leq \omega \leq \omega_0 + \frac{1}{T_1} \quad (78)$$

In this region, the absolute value frequency response of the corrected open loop is hardly influenced, while out of this region a considerable drop of the absolute value occurs such that possible undesired resonances can be dropped.

Figure 6A:
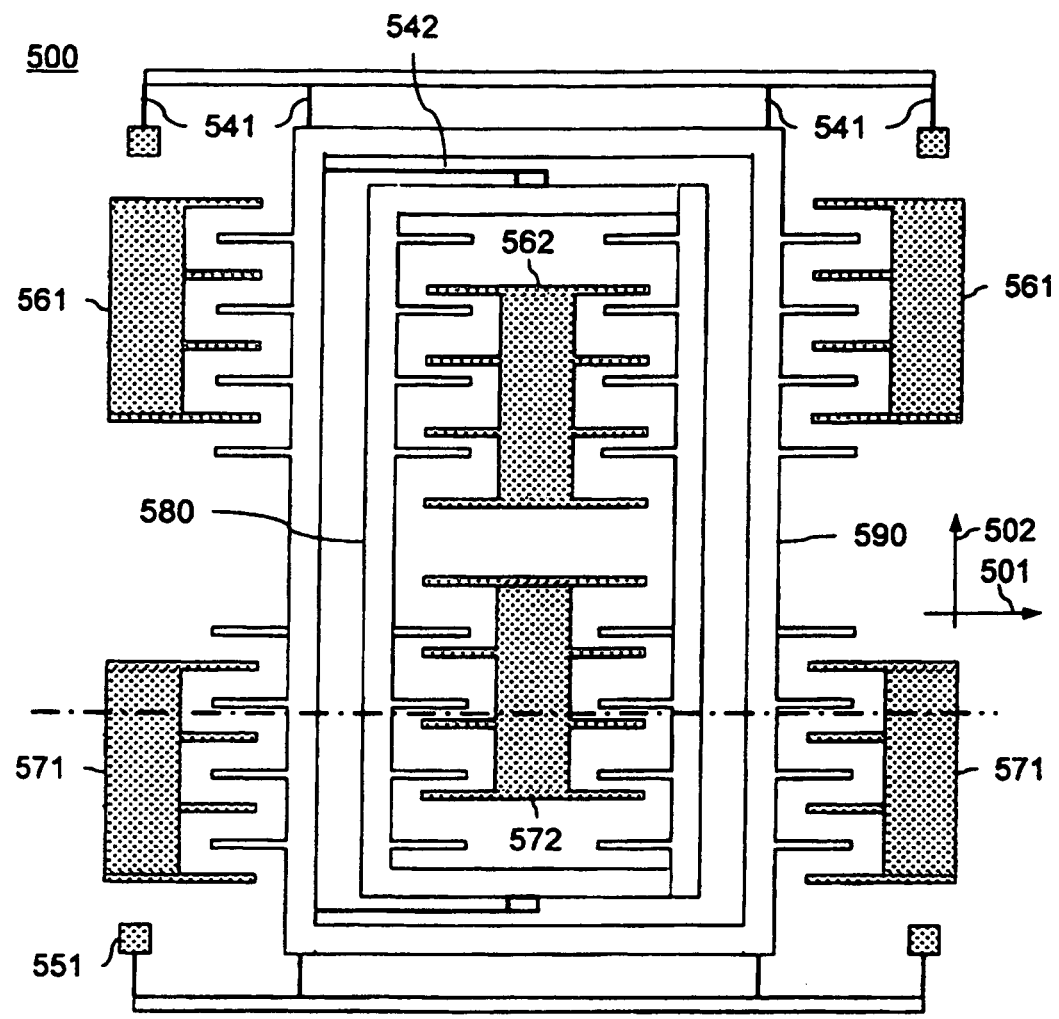
FIG. 6A is a schematic top view of the micromechanical part of a rotation rate sensor according to another embodiment of the invention.
Figure 6B:
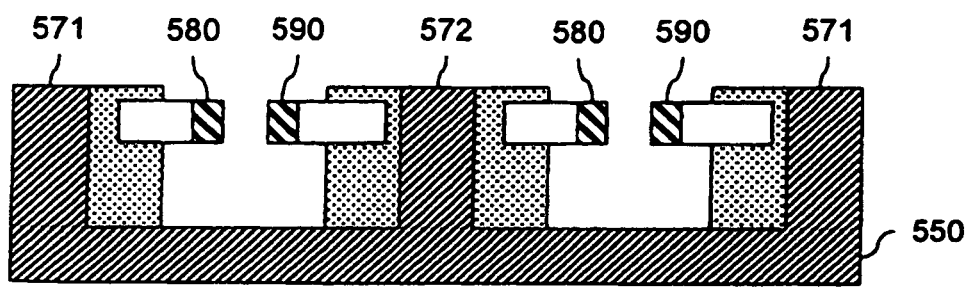
FIG. 6B is a schematic cross-sectional view of the micromechanical part of the rotation rate sensor of FIG. 6A.
Figure 6C:
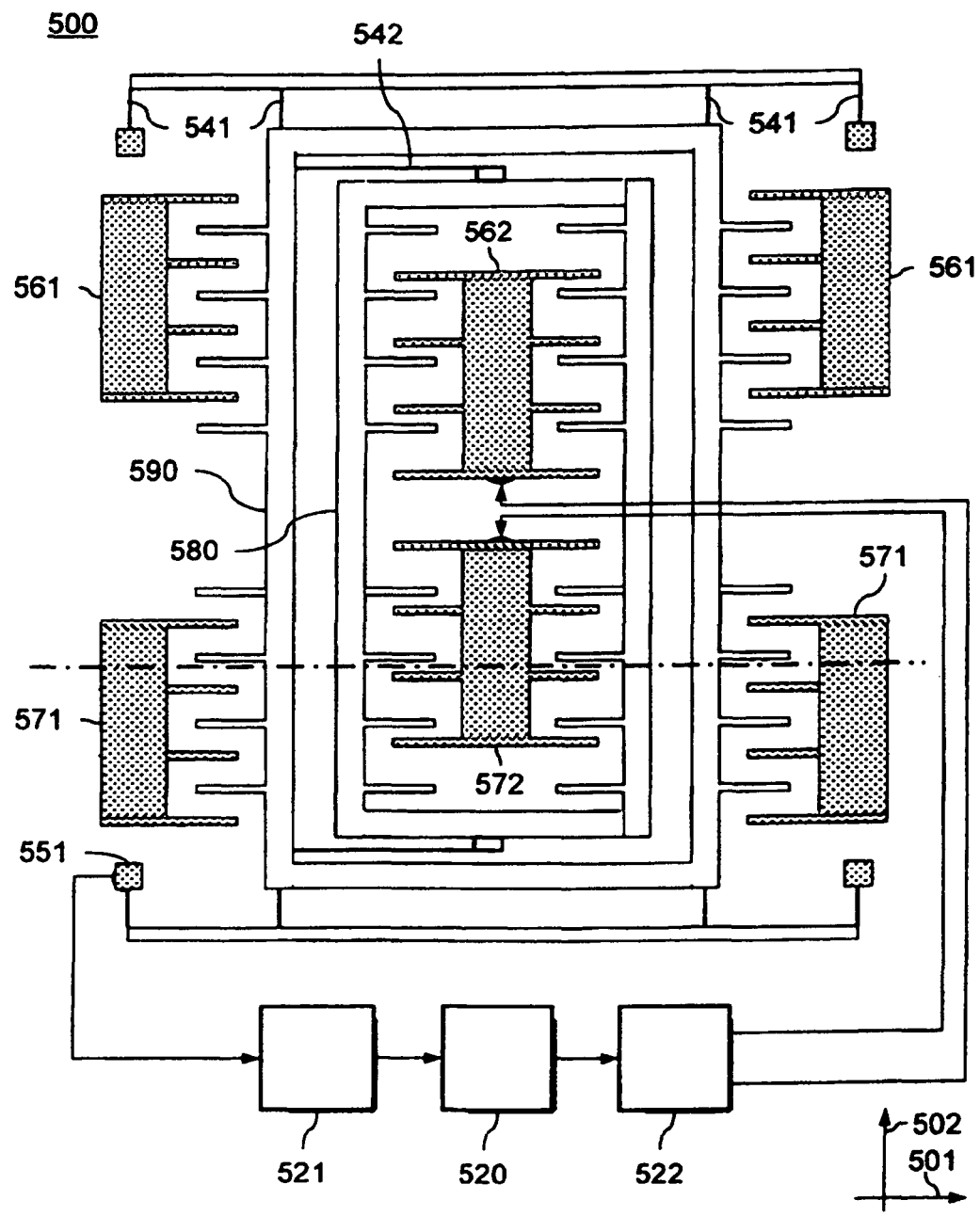
FIG. 6C is a schematic block diagram of the rotation rate sensor according to FIGS. 6A and 6B.

FIGS. 6A to 6C refer to a micromechanical rotation rate sensor 500 according to a further embodiment. The rotation rate sensor 500 includes an excitation unit 590 (e.g. an excitation frame) suspended at first spring elements 541. The first spring elements 541 couple the excitation unit 590 to an attachment structure 551 which is fixedly connected to a support substrate 550 illustrated in FIG. 6B. The spring elements 541 weakly damp a deflection of the excitation unit 590 with respect to the support substrate 550 along the direction of excitation. A detection unit 580 is coupled over second spring elements 542 to the excitation unit 590 and is movable with respect to the excitation unit 590 mainly along a detection direction 502 orthogonal to the direction of excitation 501. The direction of excitation 501 and the detection direction 502 run parallel to a surface of the support substrate 550. The first and second spring elements 541, 542 are, for example, beam-like structures with small cross sections, which are formed between each of the structures to be coupled.

According to one embodiment, the rotation rate sensor 500 includes first force transmission and sensor units 561, 571 (e.g. electrostatic force transmitters and sensors) which excite the system formed of the excitation unit 590 and the detection unit 580 to oscillation along the direction of excitation 501 and/or are able to capture a corresponding deflection of the excitation unit 590. The rotation rate sensor 500 includes further second force transmission and sensor units 562, 572 (e.g. electrostatic force transmitters and sensors) which act on the detection unit 580 and/or are able to capture its deflection. According to one embodiment, at least one of the second force transmission and sensor units 562, 572 is controlled so that it counteracts a deflection of the detection unit 580 caused by a disturbance or, in case of a closed loop system, caused by a measured variable.

During operation of the rotation rate sensor 500, the first force transmission and sensor units 561, 571 excite, for example, the excitation unit 590 to oscillation along the direction of excitation 501, wherein the detection unit 580 moves approximately with the same amplitude and phase as the excitation unit 590. When the arrangement is rotated around the axis orthogonal to the substrate plane, a Coriolis force acts on the excitation unit 590 and the detection unit 580 to deflect the detection unit 580 with respect to the excitation unit 590 in the detection direction 502. The second force transmission and sensor units 562, 572 capture the deflection of the deflection unit 580 and, thus, the rotational movement around the axis orthogonal to the substrate plane.

According to one embodiment, at least one of the force transmission and sensor units 561, 572, 562, 572 acts as actuator and either the excitation unit 590 or the detection unit 580 acts as oscillator within the meaning of one of the devices 200 described above.

According to an embodiment of the rotation rate sensor 500 illustrated in FIG. 6C, for example, the first force transmission and sensor units 561, 571 excite the excitation unit 590 to oscillation with the resonance angular frequency $\omega_0$ along the direction of excitation 501. In a control loop according to the preceding discussion, an oscillation of the detection unit 580 along the detection direction 502 (x2-oscillator) can then correspond, for example, to the harmonic force signal as described above.

The deflection of the x2-oscillator can be captured via the charge on the common movable electrode that is formed on the excitation unit 590. The charge can be measured via the attachment structure 551. A charge amplification unit 521 amplifies the measured signal. While a demodulation unit typically modulates the measured signal with a frequency that corresponds, for example, to the resonance angular frequency $\omega_0$ before it is fed into a controller unit, the embodiments of the invention feed the non-demodulated harmonic signal as measurement signal (within the meaning described above) into a controller unit 520 according to the above discussion.

The damping $s_0$ for the oscillation is considerably smaller than the resonance angular frequency $\omega_0$. The excitation unit 590 signal measured over the excitation frame partly reproduces the movement of the excitation unit 590 along the direction of excitation 501. A disturbance whose source can be outside the rotation rate sensor 500, or, in a closed loop system, the measurement variable, superposes the oscillation and modulates its amplitude. The controller unit 520 derives a control signal from the modulated harmonic signal for the second force transmission and sensor units 562, 572 which causes them to counteract the deflection effected by the disturbance or the measurement variable. An amplification unit 522 transforms the control signal in a suitable reset signal for the electrodes of the second force transmission and sensor units 562, 572. The controller unit 520 comprises one of of the controller main units 200 and controller extension units 600, respectively, described above.

Figure 7:
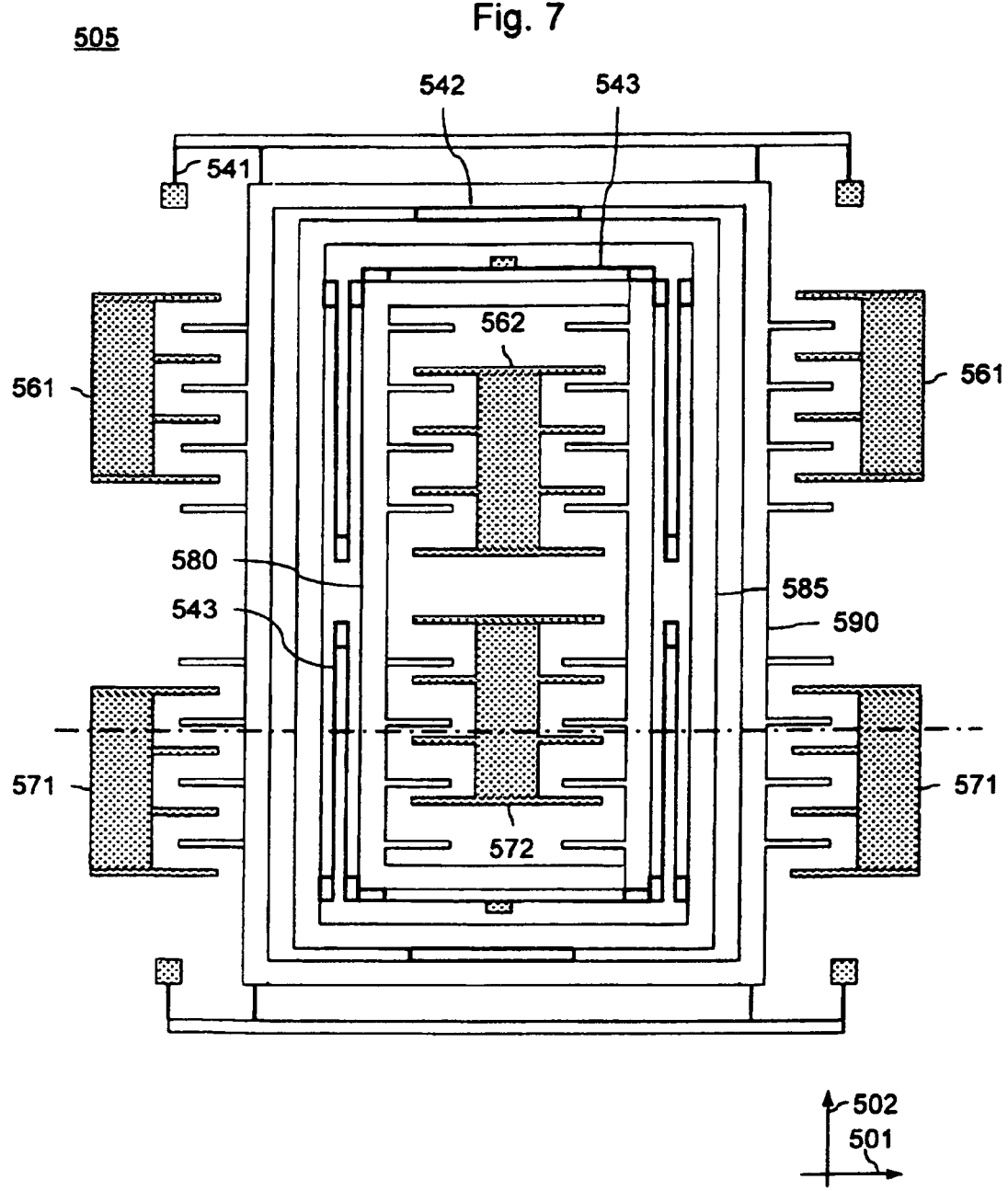
FIG. 7 is a schematic top view of the micromechanical part of a rotation rate sensor according to another embodiment of the invention.

The rotation rate sensor 505 illustrated in FIG. 7 differs from the rotation rate sensor 500 illustrated in FIG. 6A by a Coriolis unit 585 arranged between the excitation unit 590 and the detection unit 580. Second spring elements 542, which couple the Coriolis unit 585 to the excitation unit 590, allow for a deflection of the Coriolis unit 585 relative to the excitation unit 590 in the detection direction 502. Third spring elements 543, which can be partly connected to the support substrate 550, couple the detection unit 580 to the Coriolis unit 585 so that the detection unit 580 can follow the movement of the Coriolis unit 585 along the detection direction 502, but cannot follow movements along the direction of excitation 501. The detection unit 580 is fixed with respect to the direction of excitation 501 and is moveable along the detection direction 502.

According to another embodiment, at least one of the first or second force transmission and sensor units 561, 562, 571, 572 acts as actuator and either the excitation unit 590 or the detection unit 580 or the excitation unit 590 as well as the detection unit 580 act as oscillator according to one of the devices described above which are operated according to the principle of the bandpass controller. In this process the force transmission and sensor units 561 and 571 act as force transmission and sensor units, respectively, for the x1-oscillator and the force transmission and sensor units 562 and 572 act as force transmission and sensor units, respectively, for the x2-oscillator.

A rotation rate sensor according to another embodiment includes two of the arrangements illustrated in FIG. 6A or FIG. 7, which are coupled to each other such that the excitation units perform opposing oscillations in the stationary state with respect to each other. Other embodiments concern rotation rate sensors with four of the arrangements as illustrated in FIG. 6A or FIG. 7 that are coupled to one another so that every two of the excitation units perform opposing oscillations in the stationary state.

A further embodiment refers to a rotation rate sensor device having the combination of controller main unit 200 and controller extension unit 600 as illustrated in FIGS. 1, 2A and 2B. The controller main unit 200 includes at least one PI-controller 225, 325 for harmonic set point signals, which on this part has a proportional transfer element 224, 324 and an integrating transfer element 222, 322 arranged in parallel to the proportional transfer element 224, 324 wherein a controller unit of the controller main unit 200 is connected with both transfer elements 222, 224, 322, 324. The transfer function of the PI-controller 225, 325 for harmonic set point signals has a conjugate complex pole at a controller angular frequency $\omega_r$ in the s-plane or at $e^{\pm j\omega_r T}$ in the z-plane. T is the sampling time of a discrete input signal of the PI-controller 325 and $\omega_r$ is larger than 0.

To this end, the integral action coefficient of the integrating transfer elements 222, 322 and an amplification factor of the proportional transfer elements 224, 324 is chosen such that the PI-controller 225, 325 for harmonic command variables is suitable for generating, at a controller output, a harmonic oscillation of the controller angular frequency $\omega_r$ with rising amplitude, with an harmonic input signal of the controller angular frequency $\omega_r$, modulated by the step function at the controller input.

The PI-controller 225, 325 for harmonic set point signals can also be a controller derived from a conventional PI-controller for stationary set point signals, differing from it by the position of the poles in the s- or z-plane, respectively.

Figure 8:
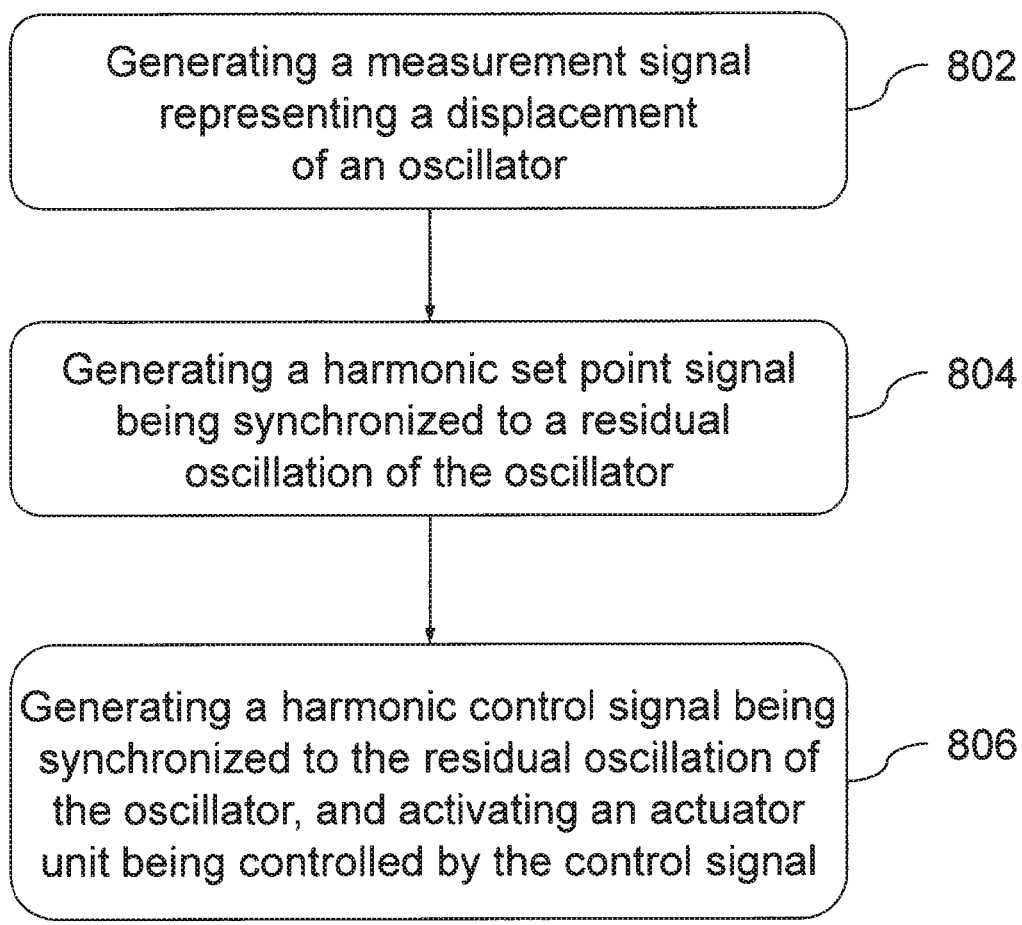
FIG. 8 illustrates a simplified process flow for a method for operating a control device.

FIG. 8 refers to a method for operating a control device with harmonic command variables. A sensor unit generates a measurement signal, which represents the deviation of an oscillator along a direction of excitation (802). A controller extension unit generates a phase synchronous harmonic set point signal with equal amplitude based on an estimation of an actual-phase and actual-amplitude of a residual oscillation of the oscillator at deactivated actuator unit (804). A controller main unit generates a synchronized control signal for the actuator unit from the measurement signal and the synchronous set point signal such that the actuator unit from the measurement signal and the synchronous set point signal can counteract against a deviation of the oscillator from a harmonic oscillation. At or after providing the synchronized control signal the actuator unit is activated (805).

While the invention has been described with reference to its presently-preferred embodiment, it is not limited thereto. Rather, this invention is limited only insofar as it is defined by the following set of patent claims and includes within its scope all equivalents thereof.

The invention claimed is:

1. A control device comprising
    a sensor unit suitable for outputting a measurement signal representing a deflection of an oscillator along a direction of excitation,
    an actuator unit acting on the oscillator, which is controllable by control signals, characterized by
    a controller main unit which is configured to deduce from the measurement signal and a harmonic set point signal a control signal for the actuator unit such that the actuator unit counteracts a deviation of the deflection of the oscillator from a set amplitude of a harmonic resonance oscillation of the oscillator, and
    a controller extension unit which is configured to determine at deactivated actuator unit from the measurement signal an actual phase and an actual-amplitude of a residual oscillation of the oscillator and to output to the controller main unit a harmonic set point signal adapted to the actual phase and the actual-amplitude such that after activating the actuator unit an amplitude of the residual oscillation of the oscillator is amplified phase synchronously up to the set amplitude and such that in this process energy contained in the residual oscillation is used.

2. The control device according to claim 1, characterized in that the controller main unit is a controller device for harmonic set point signals, wherein the controller device comprises at least one proportional transfer element and one integrating transfer element arranged parallel to the proportional transfer element and a controller input of the controller main unit is connected with both transfer elements, and
    that a transfer function of the controller device has a conjugate complex pole at a controller angular frequency $\omega_r$ in the s-plane or a pole at $e^{\pm j\omega_r T}$ in the z-plane, wherein T is the sampling time of a discrete input signal of the controller device and $\omega_r$ is larger than 0.

3. The control device according to claim 2, characterized in that an integral action coefficient of the integrating transfer element and an amplification factor of the proportional transfer element are chosen such that the controller device is suitable for generating, with a harmonic input signal of the controller angular frequency $\omega_r$ modulated by the step function at the controller input, a harmonic oscillation of the controller angular frequency $\omega_r$ with rising amplitude at the controller output.

4. The control device according to claim 3, characterized in that the integral action coefficient and the amplification factor are chosen such that the zeros of the transfer function of the controller device compensate poles of a transfer function of the oscillator.

5. The control device according to one of claim 1, characterized in that the controller extension unit comprises:
   a capturing unit, which is configured to determine from the measurement signal the actual phase and the actual-amplitude of the residual oscillation of the oscillator and to determine from the actual phase and the actual amplitude synchronisation information for the harmonic set point signal such that by the actuator unit an amplitude of the residual oscillation of the oscillator is amplified phase synchronously and that the energy contained in the residual oscillation is usable; and
   a synchronisation unit, configured to receive the synchronisation information and to determine based on the synchronisation information a phase and an initial amplitude value for the harmonic set point signal.

6. The control device according to claim 5, characterized in that the capturing unit comprises:
   a filter unit which is configured to determine from the measurement signal, from an estimation value for the current oscillation frequency, from an estimation value for the variance of a measurement noise contained in the measurement signal, and from an estimation value for a constant amplitude offset of the measurement signal estimation values for a variation in time of the residual oscillation; and
   a control unit which is configured to determine from the estimation values for the variation in time of the residual oscillation the synchronisation information describing the actual phase and the actual amplitude and to output it.

7. The control device according to claim 6, characterized in that the control unit is configured to deactivate after output of the synchronisation information the filter unit.

8. The control device according to claim 6, characterized in that the control unit is configured to activate after output of the synchronization information the actuator unit.

9. The control device according to claim 6, characterized in that the controller extension unit is configured to increase the amplitude of the set point oscillation within a predetermined time period form the initial amplitude value to a set amplitude value.

10. The control device according to claim 1, characterized in that the filter unit is a Kalman filter.

11. The control device according to claim 1, characterized in that the controller extension unit comprises a frequency storage unit, which is configured to store in temporal intervals frequency information, which describes a current oscillation frequency of the oscillator, and
   that the controller extension unit is further configured to use the stored frequency information for estimating the actual phase and the actual amplitude of the residual oscillation of the oscillator and/or for generating the harmonic set point signal.

12. The control device according to claim 1, characterized in that the control device is part of a rotation rate sensor, which forms oscillators as an excitation unit, a Coriolis unit or a detection unit, and that the actuator unit is a force transmitter, the Coriolis unit is attached to the excitation unit such that the Coriolis unit follows a movement of the excitation unit along the direction of excitation and that the Coriolis unit is additionally movable along a detection direction orthogonal to the direction of excitation, and the detection unit is attached such to the excitation unit or to the Coriolis unit that the detection unit either
   follows a movement of the excitation unit along the direction of excitation and it is additionally movable along a detection direction orthogonal to the direction of excitation, or
   follows a movement of the Corolis unit along a detection direction orthogonal to the direction of excitation and is fixed along the direction of excitation.

13. A rotation rate sensor, comprising
   a moveably supported oscillator which is excitable in a direction of excitation to a harmonic resonance oscillation,
   a sensor unit suitable for outputting a measurement signal representing a deviation of the oscillator along the direction of excitation,
   an actuator unit acting on the oscillator which is controllable by control signals, characterized by
   a controller main unit configured to deduce from the measurement signal and a harmonic set point signal a control signal for the actuator unit such that the actuator unit counteracts a deviation of deflection of the oscillator from a set amplitude of a resonance oscillation, and
   a controller extension unit configured to determine at deactivated actuator unit from the measurement signal an actual phase and an actual amplitude of a residual oscillation of the oscillator and to output to the controller main unit a harmonic set point signal adapted to the actual phase and the actual amplitude such that after activating the actuator unit an amplitude of the residual oscillation of the oscillator is amplified phase synchronously up to a set amplitude and that in this process energy contained in the residual oscillation is used.

14. The rotation rate sensor according to claim 13, wherein the oscillator is an excitation unit, which is deflectable by a force transmitter along a direction of excitation and is suitable for an oscillation with a resonance angular frequency $\omega_0$.

15. A method for operating a control device with harmonic command variables, comprising
   generating of a measurement signal representing a deflection of an oscillator along a direction of excitation by means of a sensor unit,
   generating of a phase and amplitude synchronous harmonic set point signal based on an estimation of an actual phase and an actual amplitude of a residual oscillation of the oscillator at deactivated actuator unit,
   generating of a synchronized control signal for an actuator unit from the measurement signal and the phase and amplitude synchronous harmonic set point signal such that the actuator unit counteracts the deviations of the oscillator from a harmonic oscillation, and
   activating of the actuator unit at or after providing the synchronized control signal.

16. The method according to claim 15, characterized in that the controller main unit is a controller device for harmonic set point signals, wherein the controller device comprises at least a proportional transfer element and a integrating transfer element arranged parallel to the proportional transfer element and a controller input of the controller main unit is connected to both transfer elements, and
that a transfer function of the controller device has a conjugate complex pole at a controller angular frequency $\omega_r$ in the s-plane or a pole at $e^{\pm j\omega_r T}$ in the z-plane, wherein T is the sampling time of a discrete input signal of the controller device and $\omega_r$ is larger than 0.

* * * * *